US011875435B2

(12) United States Patent
Reddy et al.

(10) Patent No.: US 11,875,435 B2
(45) Date of Patent: Jan. 16, 2024

(54) GENERATING SCALABLE FONTS UTILIZING MULTI-IMPLICIT NEURAL FONT REPRESENTATIONS

(71) Applicant: Adobe Inc., San Jose, CA (US)

(72) Inventors: Chinthala Pradyumna Reddy, London (GB); Zhifei Zhang, San Jose, CA (US); Matthew Fisher, San Francisco, CA (US); Hailin Jin, San Jose, CA (US); Zhaowen Wang, San Jose, CA (US); Niloy J Mitra, London (GB)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 17/499,611

(22) Filed: Oct. 12, 2021

(65) Prior Publication Data
US 2023/0110114 A1 Apr. 13, 2023

(51) Int. Cl.
*G06T 11/20* (2006.01)
*G06T 3/40* (2006.01)

(52) U.S. Cl.
CPC .............. *G06T 11/203* (2013.01); *G06T 3/40* (2013.01)

(58) Field of Classification Search
CPC ................................ G06T 11/203; G06T 3/40
See application file for complete search history.

(56) References Cited

U.S. PATENT DOCUMENTS

| | | | | |
|---|---|---|---|---|
| 6,678,410 B1* | 1/2004 | Phinney | ................. | G06K 15/02 382/187 |
| 6,760,028 B1* | 7/2004 | Salesin | ................. | G06T 11/203 345/468 |
| 8,553,032 B1* | 10/2013 | Poston | ................... | G06T 11/40 345/423 |
| 8,717,366 B2* | 5/2014 | Merry | .................. | G06T 11/203 345/442 |
| 2017/0039739 A1* | 2/2017 | Doran | ..................... | G06T 11/40 |
| 2019/0138860 A1* | 5/2019 | Liu | .................. | G06V 30/19173 |
| 2020/0279415 A1* | 9/2020 | Betts | ..................... | G06T 11/203 |

(Continued)

OTHER PUBLICATIONS

V. Chlumsky,J . Sloup, and I. Simecek. Improved corners with multi-channel signed distance fields. In Computer Graphics Forum, vol. 37, pp. 273-287. Wiley Online Library, 2018 (Year: 2018).*

(Continued)

*Primary Examiner* — Michael Le
(74) *Attorney, Agent, or Firm* — Keller Preece PLLC

(57) ABSTRACT

The present disclosure relates to systems, methods, and non-transitory computer-readable media for accurately and flexibly generating scalable fonts utilizing multi-implicit neural font representations. For instance, the disclosed systems combine deep learning with differentiable rasterization to generate a multi-implicit neural font representation of a glyph. For example, the disclosed systems utilize an implicit differentiable font neural network to determine a font style code for an input glyph as well as distance values for locations of the glyph to be rendered based on a glyph label and the font style code. Further, the disclosed systems rasterize the distance values utilizing a differentiable rasterization model and combines the rasterized distance values to generate a permutation-invariant version of the glyph corresponding glyph set.

20 Claims, 18 Drawing Sheets

(56) References Cited

U.S. PATENT DOCUMENTS

2021/0012547 A1* 1/2021 Kumawat ............. G06T 3/0093
2021/0248432 A1* 8/2021 Wang ................. G06K 15/1836

OTHER PUBLICATIONS

V. Chlumsky, J. Sloup, and I. Simecek. Improved corners with multi-channel signed distance fields. In Computer Graphics Forum, vol. 37, pp. 273-287. Wiley Online Library, 2018 (Year: 2018).*

V. Chlumsky, J. Sloup, and I. Šimecek. Improved corners with multi-channel signed distance fields. In Computer Graphics Forum, vol. 37, pp. 273-287. Wiley Online Library, 2018.

E. A. Dominici, N. Schertler, J. Griffin, S. Hoshyari, L. Sigal, and A. Sheffer. Polyfit: perception-aligned vectorization of raster clipart via intermediate polygonal fitting. ACM Transactions on Graphics (TOG), 39(4):77-1, 2020.

D. P. Kingma and J. Ba. Adam: A method for stochastic optimization. arXiv preprint arXiv:1412.6980, 2014.

J. J. Park, p. Florence, J. Straub, R. Newcombe, and S. Lovegrove. Deepsdf: Learning continuous signed distance functions for shape representation. In Proceedings of the IEEE/CVF Conference on Computer Vision and Pattern Recognition, pp. 165-174, 2019.

V. Sitzmann, J. N. Martel, A. W. Bergman, D. B. Lindell, and G. Wetzstein. Implicit neural representations with periodic activation functions. In Proc. NeurIPS, 2020.

M. Tancik, P. P. Srinivasan, B. Mildenhall, S. Fridovich-Keil, N. Raghavan, U. Singhal, R. Ramamoorthi, J. T. Barron, and R. Ng. Fourier features let networks learn high frequency functions in low dimensional domains. arXiv preprint arXiv:2006.10739, 2020.

Samaneh Azadi, Matthew Fisher, Vladimir G Kim, Zhaowen Wang, Eli Shechtman, and Trevor Darrell. Multi-Content gan for few-shot font style transfer. In Proceedings of the IEEE conference on computer vision and pattern recognition, pp. 7564-7573, 2018.

Alexandre Carlier, Martin Danelljan, Alexandre Alahi, and Radu Timofte. Deepsvg: A hierarchical generative network for vector graphics animation. arXiv preprint arXiv:2007.11301, 2020.

Zhiqin Chen and Hao Zhang. Learning implicit fields for generative shape modeling. In Proceedings of the IEEE/CVF Conference on Computer Vision and Pattern Recognition, pp. 5939-5948, 2019.

Yunjey Choi, Minje Choi, Munyoung Kim, Jung-Woo Ha, Sunghun Kim, and Jaegul Choo. Stargan: Unified generative adversarial networks for multi-domain image-to-image translation. In Proceedings of the IEEE conference on computer vision and pattern recognition, pp. 8789-8797, 2018.

Michael G Crandall and Pierre-Louis Lions. Viscosity solutions of hamilton-jacobi equations. Transactions of the American mathematical society, 277(1):1-42, 1983.

Antonio Elias Fabris and A Robin Forrest. Antialiasing of curves by discrete pre-filtering. In Proceedings of the 24th annual conference on Computer graphics and interactive techniques, pp. 317-326, 1997.

Kyle Genova, Forrester Cole, Avneesh Sud, Aaron Sarna, and Thomas Funkhouser. Local deep implicit functions for 3d shape. In Proceedings of the IEEE/CVF Conference on Computer Vision and Pattern Recognition, pp. 4857-4866, 2020.

Chris Green. Improved alpha-tested magnification for vector textures and special effects. In ACM SIGGRAPH 2007 courses, pp. 9-18. 2007.

Thibault Groueix, Matthew Fisher, Vladimir G Kim, Bryan C Russell, and Mathieu Aubry. A papier-mâché approach to learning 3d surface generation. In Proceedings of the IEEE conference on computer vision and pattern recognition, pp. 216-224, 2018.

Satish Gupta and Robert F Sproull. Filtering edges for gray-scale displays. ACM SIGGRAPH Computer Graphics, 15(3):1-5, 1981.

Diederik P Kingma and Max Welling. Auto-encoding variational bayes. arXiv preprint arXiv:1312.6114, 2013.

Tzu-Mao Li, Michal Lukác, Gharbi Michaël, and Jonathan Ragan-Kelley. Differentiable vector graphics rasterization for editing and learning. ACM Trans. Graph. (Proc. SIGGRAPH Asia), 39(6):193:1-193:15, 2020.

Chen-Hsuan Lin, ChaoyangWang, and Simon Lucey. Sdf-srn: Learning signed distance 3d object reconstruction from static images. In Advances in Neural Information Processing Systems (NeurIPS), 2020.

Ming Liu, Yukang Ding, Min Xia, Xiao Liu, Errui Ding, Wangmeng Zuo, and Shilei Wen. Stgan: A unified selective transfer network for arbitrary image attribute editing. In Proceedings of the IEEE/CVF Conference on Computer Vision and Pattern Recognition, pp. 3673-3682, 2019.

Charles Loop and Jim Blinn. Resolution independent curve rendering using programmable graphics hardware. In ACM SIGGRAPH 2005 Papers, pp. 1000-1009. 2005.

Raphael Gontijo Lopes, David Ha, Douglas Eck, and Jonathon Shlens. A learned representation for scalable vector graphics. In Proceedings of the IEEE/CVF International Conference on Computer Vision, pp. 7930-7939, 2019.

Ben Mildenhall, Pratul P Srinivasan, Matthew Tancik, Jonathan T Barron, Ravi Ramamoorthi, and Ren Ng. Nerf: Representing scenes as neural radiance fields for view synthesis. In European Conference on Computer Vision, pp. 405-421. Springer, 2020.

Diego Nehab and Hugues Hoppe. Random-access rendering of general vector graphics. ACM Transactions on Graphics (TOG), 27(5):1-10, 2008.

Pradyumna Reddy, Michael Gharbi, Michal Lukac, and Niloy J Mitra. Im2vec: Synthesizing vector graphics without vector supervision. arXiv preprint arXiv:2102.02798, 2021.

Ayan Sinha, Asim Unmesh, Qixing Huang, and Karthik Ramani. Surfnet: Generating 3d shape surfaces using deep residual networks. In Proceedings of the IEEE conference on computer vision and pattern recognition, pp. 6040-6049, 2017.

Towaki Takikawa, Joey Litalien, Kangxue Yin, Karsten Kreis, Charles Loop, Derek Nowrouzezahrai, Alec Jacobson, Morgan McGuire, and Sanja Fidler. Neural geometric level of detail: Real-time rendering with implicit 3D shapes. 2021.

Kenneth Turkowski. Anti-aliasing through the use of coordinate transformations. ACM Transactions on Graphics (TOG), 1(3):215-234, 1982.

Zhouhui Lian Yizhi Wang, Yue Gao. Attribute2font: Creating fonts you want from attributes. ACM Trans. Graph., 2020.

* cited by examiner

GENERATING SCALABLE FONTS UTILIZING MULTI-IMPLICIT NEURAL FONT REPRESENTATIONS

BACKGROUND

Recent years have seen a proliferation in the use of computing devices in the area of digital typography with respect to creating and editing electronic documents. Indeed, it is now commonplace for individuals and businesses to use digital typography and font editing to create customized web pages, e-mails, magazines, marketing materials, and other electronic documents utilizing desktop and laptop computers, mobile devices, tablets, smartphones, or other computing devices. However, despite the advances in digital typography, many conventional systems continue to demonstrate several deficiencies or drawbacks, particularly in accuracy and flexibility.

To elaborate, conventional digital typography systems especially struggle in the area of neural font representations. Conventional systems commonly represent digital fonts as rasterized images or in a native vector format. On one hand, digital fonts represented as vectors are non-standard and often incompatible with state-of-the-art network architectures, and thus, cannot benefit from the latest neural representations. On the other hand, rasterized fonts often lose data fidelity when encoded, which results in font-specific discontinuities such as the loss of sharp features in edges and corners of glyphs. These and other problems cause conventional systems to suffer in both accuracy and flexibility with respect to neural representations of digital fonts. Indeed, these along with additional problems and issues exist in conventional digital typography systems that represent digital fonts on computing devices.

SUMMARY

This disclosure describes one or more implementations of systems, methods, and non-transitory computer-readable media that solve one or more of the foregoing or other problems in the art with a machine learning approach for generating scalable fonts utilizing multi-implicit neural font representations. For example, the disclosed systems generate a multi-implicit neural font representation to represent a glyph by combining deep learning with differentiable rasterization. In some implementations, the disclosed systems achieve highly accurate glyphs at several resolutions utilizing an implicit differentiable font neural network to determine multiple distance values per location of a glyph, then rasterizing and combining the distance values to generate scalable rendered glyphs. For instance, in many implementations, the disclosed systems utilize a corner template function to train the implicit differentiable font neural network, which allows the disclosed systems to flexibly generate glyphs and glyph sets with sharp edges and corners irrespective of the resolution at which the glyphs are being displayed and rendered.

Indeed, as further provided below, the disclosed systems exhibit improved accuracy and flexibility in glyph generation compared to conventional digital typology systems. Additional features and advantages of one or more implementations of the present disclosure are outlined in the description which follows.

BRIEF DESCRIPTION OF THE DRAWINGS

The detailed description provides one or more implementations with additional specificity and detail through the use of the accompanying drawings, as briefly described below.

DETAILED DESCRIPTION

Figure 1:
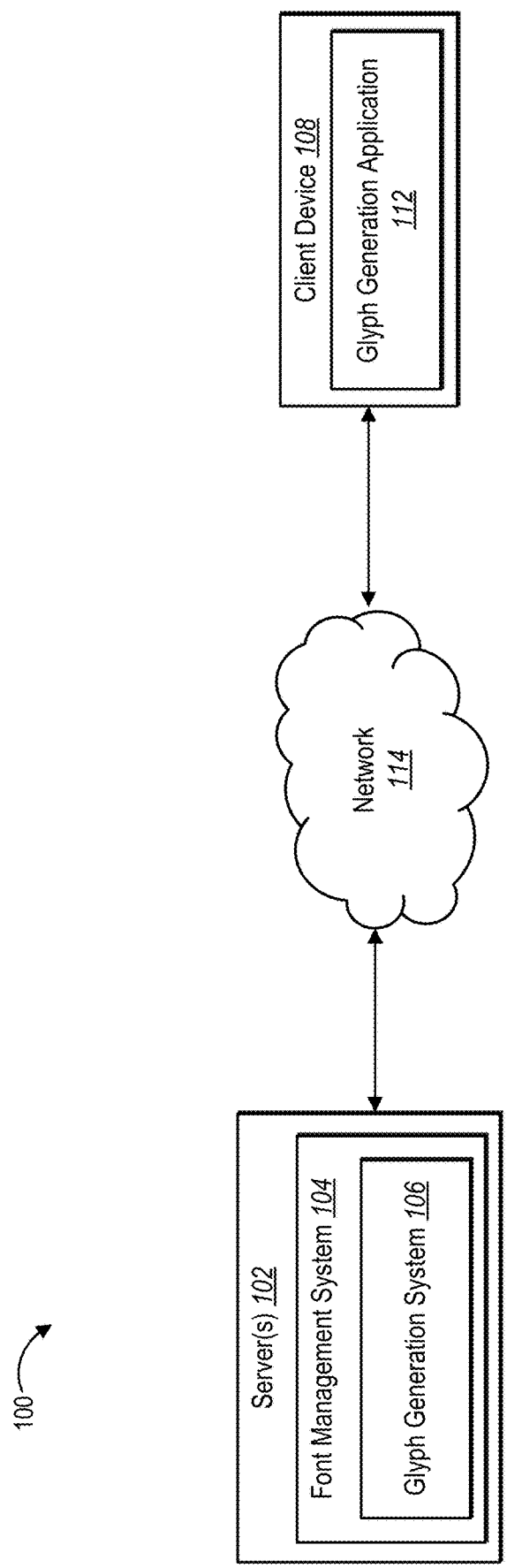
FIG. 1 illustrates an example system environment in which a glyph generation system operates in accordance with one or more implementations.

This disclosure describes one or more implementations of a glyph generation system that accurately and flexibly generates glyph representations utilizing an implicit differentiable font neural network. For instance, in various implementations, the glyph generation system utilizes multi-implicit neural font representations to represent glyphs as permutation-invariant sets of learned implicit functions. In this manner, the glyph generation system generates highly accurate glyphs and glyph sets across a large range of fonts and at any scale without feature loss (e.g., without degradation to edges or corners). Further, in one or more implementations, the glyph generation system utilizes the implicit differentiable font neural network to flexibly generate new fonts.

To elaborate, in various implementations, the glyph generation system generates a digital image of a glyph that represents an input glyph. For example, the glyph generation system determines a font style code for the glyph utilizing an implicit differentiable font neural network. Additionally, the glyph generation system determines distance values for locations of the glyph to be rendered based on a glyph label and the font style code. Further, in some implementations, the glyph generation system rasterizes the distance values utilizing a differentiable rasterization model and generates one or more digital images of the glyph based on combining the rasterized distance values.

As mentioned above, in various implementations, the glyph generation system determines a font style code for a glyph, such as an input glyph, from a rasterized digital image. For example, in one or more implementations, the glyph generation system utilizes the implicit differentiable font neural network (or simply "implicit network") to identify a known font style code, or a combination of known font styles, that closely matches the font style of the input glyph from a learned latent space (e.g., a font style embedding space). In some implementations, the glyph generation system determines a new or unknown font style code based on a combination of multiple known font style codes, as described below.

In some implementations, as noted above, the glyph generation system generates distance values based on an input glyph and its determined font style code. For example, in one or more implementations, the glyph generation system utilizes the implicit network to determine a distance value (i.e., a signed distance field value) that indicates the distance from a location or pixel in the rasterized digital image of the input glyph to a glyph boundary. Further, in many implementations, the glyph generation system determines multiple (e.g., three or more) distance values per location of the input glyph. As provided below, by determining multiple distance values for locations of the input glyph, the glyph generation system prevents degradation of glyph features, such as corners and edges, even when a resulting generated glyph is enlarged or magnified.

In various implementations, the glyph generation system rasterizes the distance values into multiple curves or channels, which make up sets of permutation-invariant implicit functions. For example, in one or more implementations, the glyph generation system utilizes a differentiable rasterization model to generate multiple curves from the distance values. Further, in some implementations, the glyph generation system combines the multiple curves to render the glyph as a neural representation of the input glyph. In certain implementations, the glyph generation system rasterizes and combines three or more signed distance values per location of the input glyph utilizing a median function that determines the opacity for a pixel at the location, as provided below.

As mentioned above, in various implementations, the glyph generation system generates the digital image of an input glyph. For example, the input glyph is a rasterized, resolution-locked image of a glyph and the glyph generation system reconstructs the input glyph into a multi-implicit neural representation of the glyph that matches the style of the input glyph and is scalable to any resolution without corner or edge degradation. In some implementations, the glyph generation system renders a reconstructed glyph from a partial image of an input glyph, such as the top or right half of the input glyph.

In one or more implementations, the glyph generation system utilizes the implicit network to generate a partial or full glyph set. For example, utilizing the font style code determined for an input glyph, the glyph generation system not only reconstructs the input glyph but also generates other glyph characters having the same font style as the input glyph. Indeed, in various implementations, the glyph generation system can greatly reduce the amount of storage needed on a computing device by storing font style codes for glyphs and fonts, rather than large font families, and quickly generating a glyph set on demand.

Similarly, in one or more implementations, the glyph generation system generates fonts having new fonts styles. For example, in various implementations, the glyph generation system interpolates between different two or more font style codes to generate a new glyph set. For example, the glyph generation system determines that a glyph has a font code style that is a combination of two known font style codes. In another example, the glyph generation system receives input requesting a new font or glyph set based on mixing portions of known font style codes. In this manner, the glyph generation system is able to both recreate font having known styles as well as create new fonts having new font styles.

In some implementations, the glyph generation system scales glyphs as well. For example, the glyph generation system upscales or downscales glyphs to increase or decrease their size without degrading appearance or losing feature detail. In some cases, the glyph generation system leverages properties of the font style code, which is a deep implicit function representation corresponding to a glyph, to scale the glyph at different sizes. Indeed, due to the continuity of the font style code, the glyph generation system is able to achieve arbitrary scales of a generated glyph.

As mentioned above, the glyph generation system generates and utilizes an implicit differentiable font neural network (e.g., implicit network) to both determine a font style code as well as generate distance values for an input glyph based on the font style code (and a glyph label). In one or more implementations, the glyph generation system builds the implicit network to include a font style embedding space. For example, the glyph generation system creates the font style embedding space by mapping known font styles to a latent vector space (i.e., the font style embedding space). Further, the glyph generation system trains the implicit network to accurately map an input glyph to the font style embedding space to determine the font style code for the input glyph, as described further below.

Additionally, in one or more implementations, the glyph generation system trains the implicit network to generate multiple distance values (i.e., signed distance values) for an input glyph based on its glyph label and font style code. In some implementations, the glyph generation system trains the implicit network with local supervision of the distance values because distance value ground truth data is unavailable. Rather, in these implementations, the glyph generation system trains the implicit network globally (e.g., with global shape loss and gradient loss) based on glyph rasterization comparisons while locally and implicitly training the implicit network to generate highly accurate distance values for locations of a glyph, as further described below.

Further, in some implementations, the glyph generation system also utilizes corner template loss to train the implicit network. For instance, in various implementations, a corner template includes three or more curves that indicate an angle and sharpness of a corner. For example, a corner template intersects multiple curves at a corner to form binary quadrants on binary maps surrounding the corner, which the glyph generation system utilizes to determine the angle and whether the corner is concave or convex. Indeed, as described below, by maximizing and minimizing the three curves in the corner template, the glyph generation system may train the implicit network to generate glyph corners that are sharp and clear when rendered at any resolution. Moreover, in this manner, the glyph generation system also significantly reduces the computational complexity for training on higher resolution shapes as compared to traditional grid image training methods.

As mentioned above, conventional systems suffer from several problems with regard to the accuracy and flexibility with respect to neural font representations. By way of context, fonts are most commonly stored in a vector form (e.g., a collection of spline curves) that is compact, efficient, and can be resampled at arbitrary resolutions without loss of features. This specialized representation, however, prevents the adaptation of many current deep learning architectures, such as image grid architectures. To avoid this problem, some custom deep learning architectures have been developed for directly producing vector output, but they typically require access to ground truth vector data for training which is not available in sufficient volume to train. Further, most vector representations are not canonical in that the same fonts can be represented by a different sequence of vectors. As a result, using vector representations can require hand-coded network parameters to account for a varying number of vector instructions. Indeed, the inflexibility of conventional systems to train neural networks with vector representations also leads to inaccurate results.

To avoid the problems of vector representations, some conventional systems alternatively train utilizing rasterized vector fonts and treat them as images. While this approach allows for using current image-based deep learning methods, the approach also inherits problems of discretized representations leading to inaccuracies, such as aliasing artifacts and loss of sharp features. Further, these conventional systems generate rigid images that are limited to fixed resolutions and cannot be resampled without introducing additional artifacts and inaccuracies.

Accordingly, as noted above, conventional systems are inaccurate with respect to neural font representations. While conventional pixel-based systems provide some level of font style representation across glyphs, these prior systems nevertheless degrade the appearance of glyphs when upscaling. Indeed, glyphs represented in the pixel space lose detail and experience degradations in appearance when increasing their scale (e.g., from a smaller glyph to a larger glyph), and sometimes even when decreasing their scale. Additionally, some conventional systems fail to adequately capture or replicate font resemblance when generating glyphs, often generating glyphs that appear out of place in relation to other glyphs within a glyph set.

In addition to their inaccuracy, some conventional font editing systems are inflexible with respect to neural font representations. More specifically, vector-based conventional systems sometimes provide better scalability than pixel-based systems but nevertheless require individual editing of each glyph in a font set. Indeed, to maintain a consistent appearance across multiple glyphs in a set, many conventional systems rigidly require individual editing and confirmation of every glyph in a glyph set (e.g., due to limitations of conventional style transfer techniques).

As suggested above, implementations of the glyph generation system provide certain improvements or advantages over conventional systems. For example, implementations of the glyph generation system improve accuracy over conventional systems. To elaborate, compared to conventional systems, implementations of the glyph generation system more accurately generate glyphs having a particular appearance (e.g., in a particular font). As opposed to conventional systems that rely on either pixel representations or vector representations of fonts, the glyph generation system utilizes multi-implicit neural font representations that enable the glyph generation system to accurately reconstruct and generate glyphs to a particular appearance. In particular, in various implementations, the glyph generation system encodes global shape loss in connection with locally implicit learning (e.g., via distance value correction) to train an implicit differentiable font neural network.

Moreover, as noted above, in many implementations, the glyph generation system utilizes a corner loss function during training to further improve the robustness and accuracy of the implicit differentiable font neural network. For example, by combining the multiple distance values (i.e., signed distance field values) with a corner loss template, the glyph generation system trains the implicit differentiable font neural network to maintain corner and edge sharpness and accuracy at any resolution. Indeed, the glyph generation system prevents degradation and detail loss when scaling glyphs for improved accuracy. Additionally, compared to conventional systems, the glyph generation system more accurately replicates font resemblance across generated glyphs, thereby generating glyphs that accurately reflect visual traits of a common font.

In addition, the glyph generation system improves flexibility over conventional systems. As one example, by generating and utilizing the font style code, the glyph generation system improves flexibility compared to conventional systems. For instance, while some conventional systems rigidly require editing each glyph independently to generate a glyph set having a common appearance, the glyph generation system more flexibly adapts the appearance of a glyph to other glyphs by utilizing font style codes to automatically propagate an initial glyph's appearance to other glyphs. As another example, the glyph generation system improves flexibility by utilizing the neural architecture of an implicit differentiable font neural network to directly train on digital images on a global level while, at the same time, implicitly training the implicit differentiable font neural network to generate consistent multi-implicit neural font representations via local supervision. Indeed, the glyph generation system capitalizes on state-of-the-art neural network architecture while overcoming the rigidity challenges faced by conventional systems.

Additionally, the glyph generation system is able to perform certain functions not found in existing systems. For example, the glyph generation system generates completed glyphs from partial glyphs, which many conventional font editing systems cannot do. To elaborate, the glyph generation system utilizes the trained implicit differentiable font neural network to generate a font style code from a partial or incomplete glyph that is missing one or more portions. From the font style code of the partial glyph, the glyph generation system further generates completed glyphs (e.g., for a corresponding glyph set) that visually resemble the appearance and style of the partial glyph.

As another advantage over conventional systems, implementations of the glyph generation system are more efficient by requiring fewer computing resources. Indeed, to make a given font viewable and usable on a given device, conventional systems often require downloading or otherwise storing large numbers of different glyph images in many different sizes for each glyph of every single font. Predictably, the computational burden becomes even greater on these prior systems as the number of fonts increases and as the resolution of the larger font sizes increases. Conversely, the glyph generation system generates a relatively small font style code that includes all of the necessary information to view and utilize an entire font (e.g., all the glyphs of the font). Indeed, the glyph generation system requires only a single font style code (as opposed to many different glyph images in many different resolutions for each glyph of a font) to generate every glyph in any size for a given font. Thus, the glyph generation system requires fewer computing resources in storing, transferring, and processing information for viewing and using fonts.

Furthermore, the glyph generation system outperforms conventional systems with respect to qualitative and quantitative results. To elaborate, researchers performed various evaluations comparing implementations of the glyph generation system described herein with multiple state-of-the-art systems. As shown below in Tables 1-3, the implementations of the glyph generation system outperformed these current systems. Further, FIGS. 9A-12, which are described below, provide qualitative results of the implementations of the glyph generation system outperforming various current systems.

Additional detail regarding the glyph generation system will now be provided with reference to the figures. For example, FIG. 1 illustrates a schematic diagram of a digital medium system environment 100 for implementing a glyph generation system 106 (i.e., a multi-implicit glyph representation system) in accordance with one or more implementations. An overview of the glyph generation system 106 is described in relation to FIG. 1. Thereafter, a more detailed description of the components and processes of the glyph generation system 106 is provided in relation to the subsequent figures.

As shown in FIG. 1, the digital medium system environment 100 ("environment 100") includes a server(s) 102 and a client device 108 connected via a network 114. Additional details regarding these computing devices are provided below in connection with FIG. 15. In addition, FIG. 15 also provides additional detail regarding networks, such as the network 114.

As illustrated in FIG. 1, the environment 100 includes the server(s) 102. The server(s) 102 generates, tracks, stores, processes, receives, and transmits electronic data, such as indications of client device interactions, fonts, glyphs, glyph modifications, images of glyphs, font style codes, and glyph labels. In some implementations, the server(s) 102 communicates with the client device 108 to transmit and/or receive data via the network 114. In some implementations, the server(s) 102 comprises a distributed server where the server(s) 102 includes a number of server devices distributed across the network 114 and located in different physical locations. The server(s) 102 can comprise a content server, an application server, a communication server, a web-hosting server, a multidimensional server, or a machine learning server. In various implementations, the server(s) 102 can store, access, and/or utilize glyph information such as fonts, font style codes, and/or glyph labels.

As shown, the server(s) 102 includes a font management system 104. In various implementations, the font management system 104 facilitates the creation, modification, sharing, installation, receipt, and/or deletion of digital fonts within electronic documents and/or system applications. Indeed, in example implementations, the font management system 104 can store, generate, modify, edit, enhance, provide, distribute, and/or share digital content, such as fonts, glyphs, digital images, or digital videos. For example, in some implementations, the font management system 104 stores a repository of fonts, such as in a font database (not shown). In addition, the font management system can access additional fonts located remotely. Further, in some embodiments, the font management system 104 is on a separate computing device. In one or more embodiments, the font management system 104 comprises ADOBE® TYPEKIT®.

A digital font (or simply font) refers to a defined set of digital glyphs (e.g., characters). In particular, in one or more implementations, a font includes a collection of digital glyphs, often referred to as a glyph set, of a particular style or typeface (e.g., a font style). A font includes digital files with the extensions, such as, but not limited to: .ttf, .otf, .fnt, .abf, .ttc, .suit, .woff, .vnf, .t65, .sfp, .sad, .pmt, .pfm, .pfb, .pfa, .odtff, .mf, .gdr, .fon, .fnt, .font, .etx, .eot, .compositefont, .acfm, .afm, or .amfm. For example, the term digital font includes fonts entitled Times New Roman, Helvetica, Arial, PT Sans Regular, Corbel, or other font titles.

As also shown, the server(s) 102 and the font management system 104 include the glyph generation system 106. As further described below in connection with the subsequent figures, the glyph generation system 106 determines font style codes for an input glyph as well as facilitates the reconstruction, generation, and interpolation of scalable rasterized glyphs and glyph sets as neural font representations from the input glyph. More particularly, the glyph generation system 106 includes an implicit differentiable font neural network and a differentiable rasterization model, as described below.

A glyph label refers to an indication of a character represented or depicted by a glyph, such as a letter or a number. For example, a glyph label identifies which glyph or partial glyph is visible in a digital image. In a number of implementations, the glyph generation system determines the glyph label for a glyph, such as utilizing an optical character recognition (OCR) based model. In some implementations, the glyph generation system determines the glyph label for a glyph from user input. In one or more implementations, a glyph label refers to a vector such as a one-hot vector representing a particular character (e.g., from an input glyph from which to generate a font style code). In some implementations, a glyph label represents a particular character portrayed or depicted by a glyph, such as a vector representation for a lowercase "a" or an uppercase "W."

A glyph style or font style, as used herein, refer to a name, description, characteristic, or attribute associated with a glyph. For instance, a font style corresponds to a known font with a standardized name (e.g., Times New Roman, Helvetica, Arial), look, or feel. In various implementations, the font style is an interpolation of two or more font styles. In some embodiments, a font style includes the visual appearance, characteristics (e.g., thin, block, modern, antique, crazy), usage or utility (e.g., headline, poster, magazine, logo), family, mood, and/or other special properties of a glyph or glyph set. Additionally, a font style can also indicate attributes corresponding to a font, such as style (e.g., regular, bold, italic, shadowed, underlined, strikethrough, hand-written, subscript, or superscript), weights (e.g., light, regular, and heavy weights), widths (e.g., condensed, regular, and extended widths), capitalization styles (e.g., all caps, small caps, title case, and sentence case), x-heights (e.g., small, regular, and large x-heights), and contrasts (e.g., low, regular, and high contrasts). In some implementations, a font style is labeled with a font style code, as described below.

A digital image of a glyph, glyph image, font image, input image, or simply image refer to any type of electronic document, picture, or file that includes written text (i.e., glyph content) in a font style. For example, a font image can include an electronic document in the form of an image file (permanent or temporary), a clipboard file, a word-processing document, a portable document file (PDF), an e-mail file, a text file, a web page, or any other electronic file. In some implementations, the image of a glyph is a rasterized image. In various implementations, the image of a glyph is based on a vector representation of the glyph. In addition, a glyph image can be associated with metadata, such as fonts (e.g., font names), font styles, and/or glyph labels.

A neural network refers to a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network can include an implicit differentiable font neural network, a convolutional neural network, a recurrent neural network (e.g., an LSTM), a graph neural network, and/or a generative neural network.

Along these lines, a neural network often includes an encoder and a decoder. For example, an encoder refers to a neural network layer that extracts or encodes features from a glyph label and/or a font style code. For example, an encoder analyzes or processes input data such as a glyph label and/or a font style code to extract numerical or mathematical representations of the glyph label together with and/or separate from the font style code. Relatedly, the term decoder refers to a neural network layer that generates parameters from a latent vector including one or more extracted or encoded features. For example, a decoder includes layers or neurons to decode extracted features into distance values for generating a predicted or rendered glyph.

In one or more implementations, the server(s) 102 includes all, or a portion of, the glyph generation system 106. In alternative implementations, the glyph generation system 106 is divided across multiple computing devices, such as the server(s) 102 and the client device 108. For example, the server(s) 102 trains the implicit differentiable font neural network using one or more loss models and provides the trained implicit differentiable font neural network to the client device 108 for storage and operation. Indeed, in certain implementations, the glyph generation system 106 provides tools for the client device 108 to provide neural font representations of a glyph or glyph set based on an input glyph.

A loss function or loss model refer to a function that indicates error amounts (e.g., measures of loss). As mentioned above, in some embodiments, a machine-learning algorithm repetitively trains to minimize overall loss (and maximize loss in some cases). In some embodiments, the semantic layout system employs multiple loss functions and minimizes overall loss between multiple networks and models. Examples of loss functions include corner template loss, global shape loss, gradient loss, alpha loss, and divergent loss, each of which is further described below.

As mentioned above, the glyph generation system utilizes an implicit differentiable font neural network. An implicit differentiable font neural network or simply implicit network refers to a machine learning model that generates font style codes and/or distance values. In some implementations, an implicit differentiable font neural network includes an auto-decoder neural network, which is a multi-layer perceptron (MLP) architecture. In some implementations, the implicit differentiable font neural network includes a latent embedding space (e.g., font style embedding space) used to map glyphs to known and unknown font style codes, as described below.

Additionally, in some implementations, the server(s) 102 and/or glyph generation system 106 receives data from the client device 108 corresponding to fonts and glyphs. For example, the server(s) 102 receives a request from the client device 108 to generate a glyph set from a partial image of an input glyph. In response, the glyph generation system 106 generates a glyph or glyph set and transmits data to the client device 108 to cause the client device 108 to display or present the completed glyph or glyph set having an appearance or style similar to that of the received input glyph.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 15. Although FIG. 1 illustrates a single instance of the client device 108, in some implementations, the environment includes multiple different client devices, each associated with a different user (e.g., a digital content editor). The client device 108 communicates with the server(s) 102 via the network 114, as noted above.

As shown in FIG. 1, the client device 108 includes a glyph generation application 112. In some implementations, the glyph generation application 112 is a web application, a native application installed on the client device 108 (e.g., a mobile application, a desktop application, etc.), or a cloud-based application where all or part of the functionality is performed by the server(s) 102. Based on instructions from the glyph generation application 112, the client device 108 presents or displays information to a user, including glyphs created from the glyph generation system 106.

In certain cases, the client device 108 includes all or part of the glyph generation system 106. For example, the client device 108 can generate, obtain (e.g., download), or utilize one or more aspects of the glyph generation system 106, such as an implicit differentiable font neural network from the server(s) 102. Indeed, in some implementations, as illustrated in FIG. 1, the glyph generation system 106 is located in whole or in part of the client device 108. For example, the glyph generation system 106 includes a web hosting application that allows the client device 108 to interact with the server(s) 102 such as accessing a web page supported and/or hosted by the server(s) 102.

Although FIG. 1 illustrates a particular arrangement of the environment, in some implementations, the environment has a different arrangement of components and/or may have a different number or set of components altogether. For instance, as mentioned, the glyph generation system 106 is implemented by (e.g., located entirely or in part on) the client device 108. In addition, in one or more implementations, the client device 108 communicates directly with the glyph generation system 106, bypassing the network 114.

Figure 2:
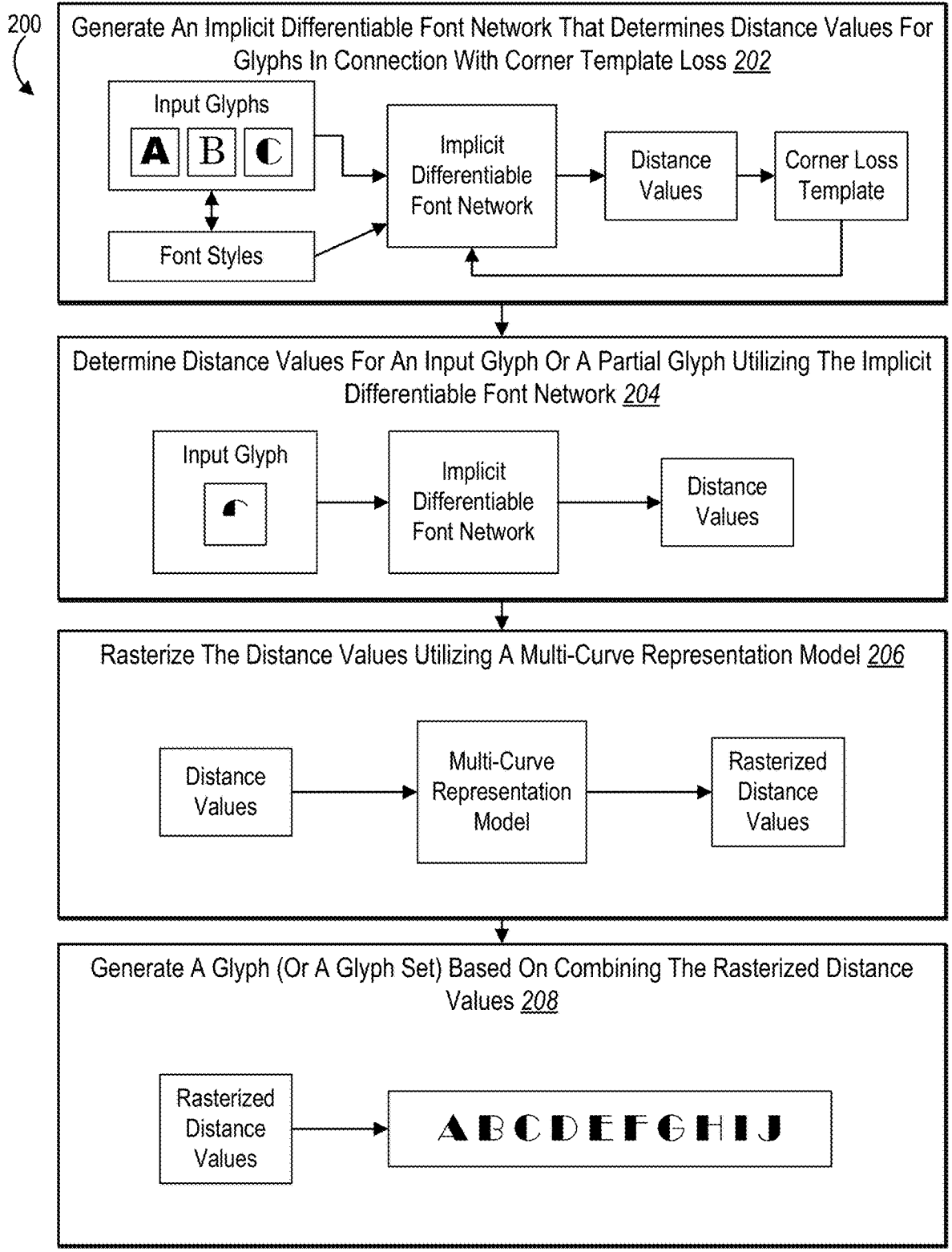
FIG. 2 illustrates an overview diagram of generating and utilizing an implicit differentiable font neural network to render a glyph or glyph set in accordance with one or more implementations.

As mentioned, in one or more implementations, the glyph generation system 106 generates a glyph set to resemble an appearance of an input glyph. In particular, the glyph generation system 106 generates a font style code for a font corresponding to an input glyph (e.g., an initial glyph) and further generates additional glyphs for a glyph set utilizing the font style code. FIG. 2 illustrates an example sequence of acts 202-206 for generating a glyph set based on a font style code in accordance with one or more implementations.

As indicated above, FIG. 2 illustrates an overview diagram of generating and utilizing an implicit differentiable font neural network to render a glyph or glyph set in accordance with one or more implementations. In particular, FIG. 2 includes a series of acts 200 performed by the glyph generation system 106 to render a glyph or glyph set from an input glyph.

As shown, FIG. 2 includes the glyph generation system 106 performing an act 202 of generating an implicit differentiable font neural network that determines distance values for glyphs in connection with corner template loss. In one or more implementations, the glyph generation system 106 generates, trains, or otherwise obtains an implicit differentiable font neural network (or simply "implicit network") to generate distance values to facilitate reconstructing, generating, and/or interpolating multi-implicit neural glyph representations. In various implementations, the glyph generation system 106 utilizes various loss functions, including corner template loss to train the implicit network to generate sharp edges and corners when scaled to any resolution.

In various implementations, the glyph generation system 106 also learns a font style embedding space (i.e., latent embedding space) as part of the implicit network. For example, the glyph generation system 106 learns the font styles of input glyphs and maps font style codes to the font style embedding space. In this manner, the glyph generation system 106 is able to utilize the implicit network to determine font style codes for input glyphs. Additional detail regarding generating and training the implicit differentiable font neural network is provided below in connection with FIGS. 3-5.

As shown, the series of acts 200 includes an act 204 of determining distance values for an input glyph or partial glyph utilizing the implicit differentiable font neural network. In various implementations, the glyph generation system 106 receives an input glyph as part of a request to reconstruct the glyph as a multi-implicit neural glyph representation. In response, the glyph generation system 106 utilizes the implicit network to generate multiple distance values (e.g., three or more) per location (e.g., per pixel) of the input glyph to implicitly represent the glyph.

In some implementations, the glyph generation system 106 further generates the distance values based on a glyph label and a font style code for the input glyph. In one or more implementations, the glyph generation system 106 receives and/or determines the glyph label and the font style code for the input glyph. For example, in certain implementations, the glyph generation system 106 determines the glyph label utilizing a text recognition model. More specifically, in example implementations, the glyph generation system 106 utilizes a text recognition model trained to determine (or otherwise capable of determining) a character designation from a depiction of a glyph. Similarly, in various implementations, the glyph generation system 106 utilizes the implicit network to determine the font style code for the input glyph. Additional detail regarding generating distance values utilizing the implicit differentiable font neural network is provided below in connection with FIGS. 5-8.

As also shown, the series of acts 200 includes an act 206 of rasterizing the distance values utilizing a multi-curve representation model. For instance, in various implementations, the glyph generation system 106 rasterizes the distance values by generating multiple curves or channels (e.g., three or more) from the multiple distance values. In some implementations, the glyph generation system 106 utilizes a differentiable rasterization model as part of the multi-curve representation model to generate the multi-curve representation of the input glyph. Additional detail regarding generating multi-curve representations is provided below in connection with FIGS. 5-8.

As shown, the series of acts 200 includes an act 208 of generating a glyph or a glyph set based on combining the rasterized distance values. For instance, in various implementations, the glyph generation system 106 utilizes a medium function to combine the multiple rasterized distance values (e.g., curves or channels) to generate a combined multi-channel representation of the glyph. As noted above, in one or more implementations, the glyph generation system 106 combines three curves to generate a multi-implicit neural glyph representation of the glyph.

Additionally, in various implementations, the glyph generation system 106 renders a glyph from the multi-implicit neural glyph representation of the glyph. Because the glyph is represented as a multi-implicit neural glyph representation, the glyph generation system 106 can render the glyph at any resolution without degradation or loss to edges and corners.

Further, using the same font style code, the glyph generation system 106 can generate different glyphs having the same font style and appearance also as the input font. In some implementations, the glyph generation system 106 can generate glyphs having a new font style that is a combination of two or more known font styles. Additional detail and visual examples regarding generating multi-implicit neural glyph representations are provided below in connection with FIGS. 5-8.

Figure 3:
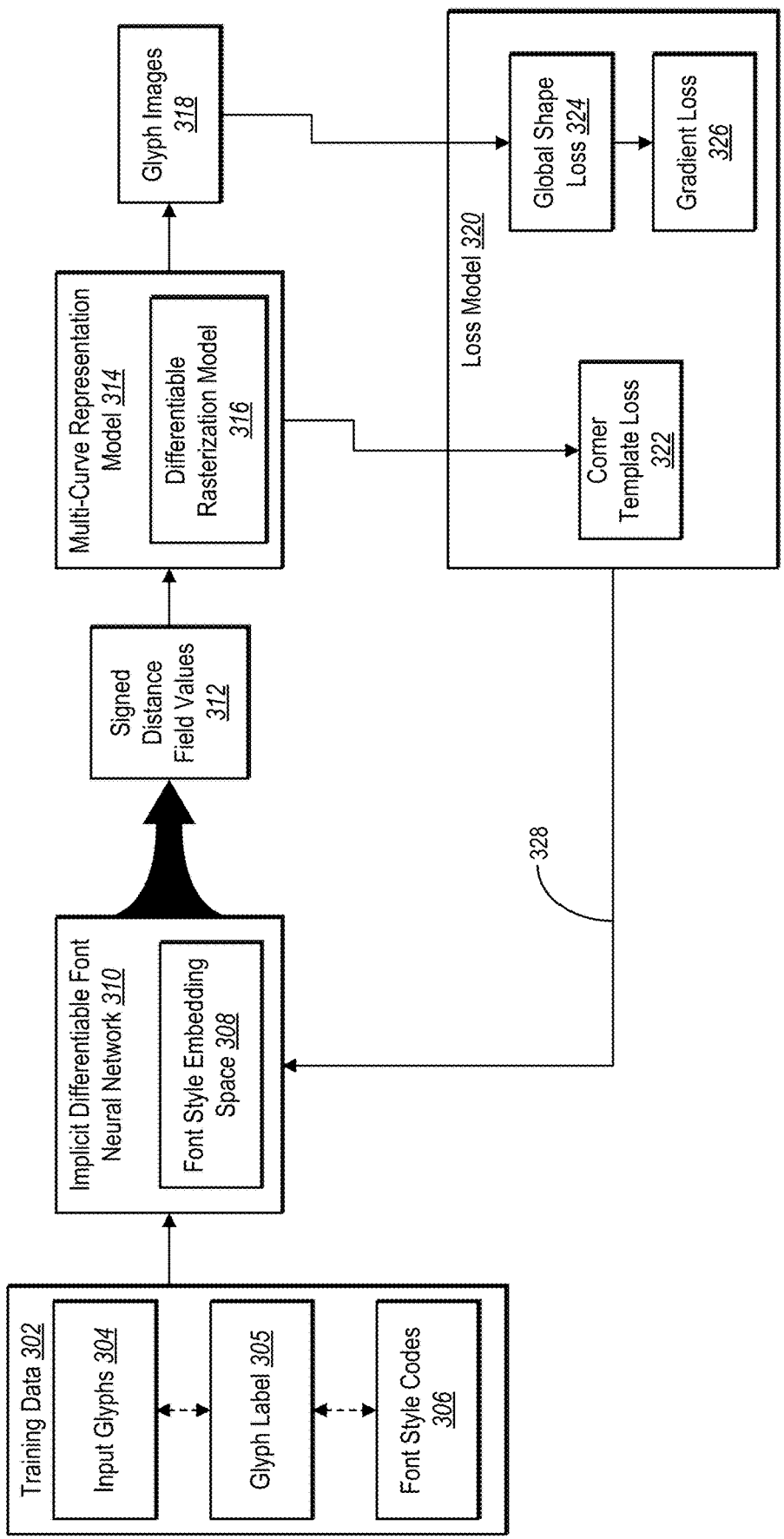
FIG. 3 illustrates a block diagram of generating an implicit differentiable font neural network to determine distance values based on corner template and other loss functions in accordance with one or more implementations.

As mentioned above, FIG. 3 provides detail regarding generating and training the implicit differentiable font neural network. For instance, FIG. 3 illustrates a block diagram of generating an implicit differentiable font neural network to generate distance values based on corner template and other loss functions in accordance with one or more implementations. More particularly, FIG. 3 illustrates generating and training an implicit differentiable font neural network 310 (or simply "implicit network 310") based on both global loss and local loss.

As shown, FIG. 3 includes training data 302, the implicit network 310 that generates signed distance field values 312, a multi-curve representation model 314 that generates glyph images 318, and a loss model 320. As also shown, the training data 302 includes input glyphs 304, glyph labels 305, and font style codes 306. The implicit network 310 includes a font style embedding space 308. The multi-curve representation model 314 includes a differentiable rasterization model 316. The loss model 320 includes loss functions for corner template loss 322, global shape loss 324, and gradient loss 326.

As mentioned above, FIG. 3 includes training data 302, having the input glyphs 304, glyph labels 305, and font style codes 306. In various implementations, the input glyphs 304 include complete or partial rasterized images of glyphs. The input glyphs 304 may range from high-quality images of glyphs with high resolutions to lower quality images at lower resolutions. For example, the glyph generation system 106 accesses a repository of over 50,000 images of glyphs (e.g., from over 1,000 font families) as the input glyphs 304.

As shown by dashed arrows in FIG. 3, the input glyphs 304 may correspond to glyph labels 305. For example, the glyph labels 305 signal or otherwise indicate the character of a corresponding input glyph (e.g., lowercase "w" or capital "T"). Further, as described above, in some implementations, the glyph generation system 106 trains the implicit network 310 or uses another model (e.g., a machine-learning text recognition model) to determine glyph labels of the input glyphs 304. In some cases, the glyph generation system 106 generates the glyph label in the form of a one-hot vector indicating the character that is depicted (e.g., the lowercase "a") in connection with providing the glyph label to the implicit network 310.

As also shown by the dashed arrows in FIG. 3, the input glyphs 304 may correspond to font style codes 306. In various implementations, the font style codes 306 can include the name, attributes, style, or other characteristics of a corresponding input glyph. In some implementations, the font style code 306 includes a one-hot vector with a length that corresponds to a number of different anchor fonts (e.g., 1,000, 10,000, or a different number of anchor fonts). For example, the glyph generation system 106 encodes the font style codes 306 as a one-hot vector in connection with providing the input glyphs 304.

In some implementations, information corresponding to one or more glyph labels and font style codes is encoded within an input glyph. For example, an input glyph includes metadata indicating the character shown (i.e., a glyph label) in a corresponding digital image, such as a glyph label of lowercase g. Additionally, or in the alternative, the input glyph includes metadata indicating the font style code, size, resolution, and/or other information.

As shown in FIG. 3, the glyph generation system 106 provides the training data 302 to the implicit network 310. In one or more implementations, the glyph generation system 106 generates the font style embedding space 308 based on the training data 302. For example, the glyph generation system 106 concatenates a glyph label with an initial font style code for an initial iteration. In some cases, the glyph generation system 106 initializes the font style code for the first iteration at an initial value (e.g., by random sampling from a normal distribution with a mean of 0 and a standard deviation of 0.001). Throughout training, the glyph generation system 106 trains the implicit network 310 via back-propagation to learn different font style codes corresponding to different font families. Indeed, in various implementations, the glyph generation system 106 learns and generates the font style embedding space 308 by mapping each known font style to a location within the font style embedding space 308.

Additionally, in various implementations, the glyph generation system 106 trains the implicit network 310 to generate distance values. For example, in one or more implementations, the implicit network 310 generates at least three signed distance field values 312 for each pixel of the input glyph. In some implementations, during training, the implicit network 310 determines signed distance field values 312 for a subset of the pixels of the input glyph. For example, the glyph generation system 106 omits or samples less from pixels in a digital image of an input glyph that are located outside of the glyph boundaries.

A signed distance value, signed distance field, or simply distance value refers to a function that indicates the distance between a location and the boundary of a glyph. For example, a distance value indicates the distance between the center of a pixel in a digital image of a glyph and the closest boundary of the glyph. Further, the signed portion of the signed distance value indicates whether the location (e.g., pixel) is located inside the glyph or outside the glyph. As described below, in various implementations, the glyph generation system utilizes the implicit differentiable font neural network to determine multiple distance values for locations of a glyph (e.g., an input or template glyph).

In one or more implementations, the glyph generation system 106 generates a first set of signed distance field values for locations (e.g., pixels) of an input glyph based on a glyph label and a font style code. In addition, the glyph generation system 106 repeats the process and generates a second set, a third set, and/or additional sets of signed distance field values per location of the input glyph. In many implementations, one or more distance values for a given location or pixel differ from one another and/or are based on slightly different formulations (e.g., the closest boundary versus the next/second closest boundary).

In generating a signed distance field value for a location or pixel of an input glyph, the glyph generation system 106 learns to predict how far away the center of the pixel is from the closest boundary of the input glyph based on the label and style of the glyph. In this manner, the implicit network 310 generates a zero-level-set for the input glyph that represents the font as implicit functions rather than a binary set of zeros and ones. In many instances, using an implicit function over rasterized pixels to represent a glyph allows the glyph to be rendered across a large range of resolutions, which is described further below.

As noted above, the implicit network 310 generates multiple sets of signed distance field values 312 for locations of input glyphs 304 based on corresponding glyph labels 305 and font style codes 306. With a single signed distance field value, the glyph generation system 106 is able to render glyphs with moderate accuracy by modeling the signed distance field values as a collection of two-dimensional shapes. However, as the scale of a rendered glyph increases, sharp features such as corners and edges begin rounding and losing their detail. Accordingly, the glyph generation system 106 can add a second signed distance field value for each of the locations. While two signed distance field values preserve better corner sharpness when rendered, two distance values can only represent either a convex corner or a concave corner across a glyph, but not both together. Accordingly, by generating three or more signed distance field values per location, the glyph generation system 106 is able to preserve edge and corner sharpness irrespective of zoom level while also accurately representing different corner types found in most glyphs (e.g., concave and convex corners).

Regarding the architecture of the implicit network 310, in various implementations, the implicit network 310 comprises an auto-decoder neural network that extracts or encodes features from a glyph label and a font style code. For example, the implicit network 310 includes an 8-layer multi-layer perceptron (MLP) to concatenate the glyph label and the font style code as input and extracts or encodes a latent vector representing a high-level feature carrying glyph and font information. In some implementations, the implicit network 310 has a structure including a number of neurons. For instance, the implicit network 310 includes 384 neurons (or another number) in each of the hidden layers.

As mentioned above, in some implementations, the glyph generation system generates a font style code for a font corresponding to a given glyph (e.g., an input glyph). A font style code refers to a generated code representing the appearance of a font (or glyph). For example, a font style code refers to a numerical or vector representation of a font from among a set of known fonts, representing an interpolation between known fonts, and/or representing a generated font (e.g., a combination of two or more fonts). In some cases, a font style code has a size corresponding to a number of known fonts (e.g., a vector of length 1,000 for 1,000 known fonts) and includes indications of which of the fonts contribute to the makeup of the font style code (or the font corresponding to the font style code).

In one or more implementations, the implicit network 310 utilizes a LeakyReLU activation function as the non-linearity to generate a latent embedding z that includes a 128-dimension vector. In some implementations, the implicit network 310 applies a skip connection between inputs and the third hidden layer (e.g., the inputs are concatenated to the output of the third hidden layer) to improve convergence.

In some implementations, the glyph generation system 106 utilizes an ADAM optimizer to train the implicit network 310 with a learning rate of 10-3 for 2,000-3,000 epochs. Additionally, rather than following a traditional training routine when learning reconstruction and interpolation tasks, in various implementations, the glyph generation system 106 freezes the learned latent embedding weights after 1,000 epochs, such that training better stabilizes across glyphs of the same font family.

As noted above, training data that includes ground truth signed distance field values is uncommon, especially in the volume needed to accurately trains a neural network. Additionally, ground truth data that includes multiple signed distance field values for the same location of glyphs are even less common. Moreover, training on the ground truth signed distance field values alone sometimes results in lower quality raster images with respect to boundary smoothness. In contrast, training with the supervision of rasterized images consistently results in smoother and more accurate glyph boundaries. Accordingly, the glyph generation system 106 trains the implicit network 310 using rasterized images in a manner that also implicitly learns multiple signed distance field values per location of an input glyph.

More particularly, the glyph generation system 106 generates rasterized glyphs from the signed distance field values 312, which the glyph generation system 106 then utilizes to train the implicit network 310. To illustrate, FIG. 3 shows the multi-curve representation model 314, which models the signed distance field values 312 (e.g., two-dimensional shapes) as multiple curves (e.g., multiple raster channels), as well as combines the multiple curves into a differentiable rasterizer to generate a final glyph image. In addition, the multi-curve representation model 314 facilitates the corner template loss function as a training tool for the implicit network 310, as described below in connection with FIG. 4.

As shown, the multi-curve representation model 314 includes the differentiable rasterization model 316. At a high level, the multi-curve representation model 314 converts a distance value to a pixel image in a differentiable manner. More specifically, in various implementations, the differentiable rasterization model 316 deferentially renders the signed distance field value 312. For example, the multi-curve representation model 314 determines the opacity of a given location (e.g., pixel) based on its distance value (e.g., signed distance field value).

In one or more implementations, the multi-curve representation model 314 utilizes the formulations provided in Equations 1 and 2 below.

$$I(x, y) = K\left(\min_{i \in \mathcal{F}} d_i(x, y)\right) g(x, y) \quad (1)$$

$$K(d) = \begin{cases} 1 \\ k\left(\frac{d}{\gamma}\right) = \frac{1}{2} + \frac{1}{4}\left(\left(\frac{d}{\gamma}\right)^3 - 3\left(\frac{d}{\gamma}\right)\right) & \text{if } d > \gamma \\ 0 & \text{if } -\gamma \le d \le \gamma \\ & \text{if } d < -\gamma \end{cases} \quad (2)$$

As shown in Equation 1, $d_i(x,y)$ indicates a signed distance field value (i.e., an SDF) of the distance from the center of pixel (x, y) to the closest point on the i-th curve corresponding to font F. Additionally, in Equation 1, K denotes a function that approximates the opacity of pixel (x, y) based on the distance value. Further, in Equation 1, each $d_i(x, y)$ is modeled using the implicit network 310. In addition, the function g models the spatially-varying texture of the shape. For solid fonts, the function g is set to 1. As described further below, for textured fonts, the glyph generation system 106 can change the spatially-varying texture of the shape by adjusting the value of the function g.

In some implementations, I(x, y) in Equation 1 has non-zero gradients only if (x, y) falls inside of the anti-aliasing range. Accordingly, in one or more implementations, the glyph generation system 106 utilizes a progressively decreasing anti-aliasing range strategy for better convergence and fidelity.

As shown in Equation 2, for function K, γ represents an anti-alias range and the kernel k indicates a radially symmetric continuous filter that satisfies the constraint k(1)=0 and k(−1)=1. In various implementations, the glyph generation system 106 approximates k(•) using a parabolic kernel.

Figure 7A:
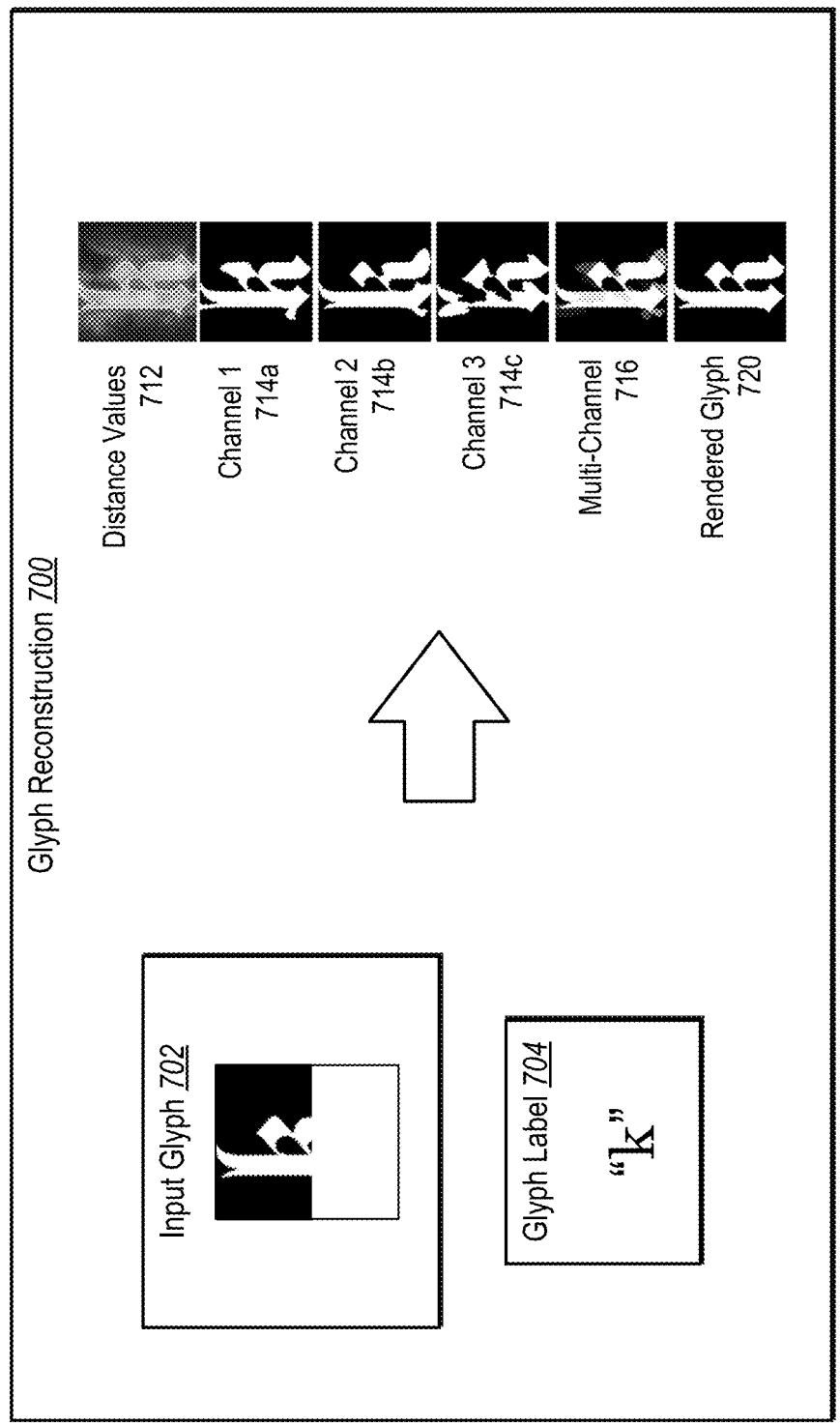
FIGS. 7A-7B illustrate examples of a reconstructed glyph and a generated glyph set utilizing the implicit differentiable font neural network in accordance with one or more implementations.

Returning to FIG. 3, in various implementations, the glyph generation system 106 (e.g., via the multi-curve representation model 314 and/or the differentiable rasterization model 316) combines the rasterized distance values (e.g., the multiple curves) generated by the multi-curve representation model 314 into a finalized glyph. For example, in one or more implementations, the glyph generation system 106 utilizes a median function (e.g., F(C) described below) to combine the multiple (e.g., three) curves or channels to render a final shape for the glyph. Indeed, as shown in FIG. 3, the multi-curve representation model 314 generates the glyph images 318. Additionally, visual examples of distance values, three separate glyph channels, and a combined multi-channel for an input glyph are shown in FIG. 7A, which is described below.

As shown, FIG. 3 includes the loss model 320. In general, the glyph generation system 106 utilizes the input glyphs 304 as ground truths and compares them to corresponding glyph images 318 as both are rasterized digital images. In this manner, the glyph generation system 106 is able to optimize the global shape of glyphs using the final render output (e.g., glyph images 318) while also locally supervising each corner to be locally represented as an intersection of two curves (e.g., before the generation of the glyph images 318). Further, in one or more implementations, the glyph generation system 106 utilizes an $l_2$ loss function (or some other loss function such as a cross-entropy loss function) to determine a loss or a distance between the glyph images 318 and the corresponding input glyphs 304.

To elaborate on the loss model 320, the glyph generation system 106 measures and/or evaluates different types of error (e.g., loss) between the glyph images 318 and the ground truth and provides the error as feedback 328 to the implicit network 310 via backpropagation over a number of iterations to better learn distance value prediction as well as font style code embeddings. Indeed, based on the loss (or an error distance), the glyph generation system 106 back propagates the feedback 328 to modify weights and parameters of the implicit network 310 for generating new predictions on the next iteration. For example, the glyph generation system 106 trains the implicit network 310 for a predetermined number of iterations (e.g., epochs), for a predetermined period of time, until one or more error amounts meets a loss threshold, and/or until the implicit network 310 converges.

FIG. 3 shows the loss model 320 including various loss functions, such as corner template loss 322, global shape loss 324, and gradient loss 326. Generally, the glyph generation system 106 utilizes the corner template loss 322 to supervise the intersection of curves locally to make glyph shapes robust against resampling and editing, the global shape loss 324 to capture glyph shapes globally, and the gradient loss 326 to accurately learn signed distance field values 312.

In various implementations, the corner template loss 322 corresponds to the glyph generation system 106 performing corner supervision to ensure sharp corners at higher resolution resampling. As shown, in various implementations, the glyph generation system 106 performs corner template loss 322 after rasterizing the signed distance field values 312 (e.g., generating three or more curves for each location on an input glyph) and before the glyph generation system 106 generates a final glyph image. Indeed, in these implementations, because the glyph generation system 106 focuses on corner supervision to ensure sharp corners at higher resolution resampling, it is unnecessary to constraint the model by multi-channel supervision globally (e.g., train on the glyph images 318).

Additional detail regarding a corner loss template and corner template loss 322 is provided in connection with FIG. 4 below. Further, in some implementations, the glyph generation system 106 improves computational efficiency during training by performing importance sampling, which is further described in connection with FIG. 5.

As mentioned above, in various implementations, the glyph generation system 106 utilizes the global shape loss 324 to capture glyph shapes globally. In one or more implementations, for global shape training, gradients are non-zero only at the anti-aliasing range, (e.g., at edges of the glyph shape). Accordingly, in these implementations, the glyph generation system 106 samples the edges of the rasterized glyph (i.e., glyph images 318) to train the implicit network 310.

More specifically, in one or more implementations, the glyph generation system 106 shapes 3×3 neighborhoods around an anti-alias pixel, where there is a sample of one value outside the shape (i.e., 0), one value inside the shape (i.e., 1), and values in between (i.e., 0-1). Additionally, the glyph generation system 106 can sample from homogeneous areas inside and outside of the glyph, such that the model does not fit a degenerate solution.

Further, in one or more implementations, the glyph generation system 106 measures global shape loss 324 between the glyph images 318 (e.g., a final rendering from the median function F(C)) and rasterized glyph I (e.g., an input glyph serving as a ground truth). In some implementations, the glyph generation system 106 utilizes a differential approximation $\hat{F}(C)$ at training time. To illustrate, all of the edges, area, and corner samples from the raster image can be used to train the implicit model via mean square error, as shown below in Equation 3.

$$L_{global} = \mathbb{E} \, (\hat{F}(C)-1)^2 \quad (3)$$

To further elaborate, in certain implementations, when optimizing the shape of rendered glyphs through training, the median operation (e.g., F(C)) only routes the gradients to the corresponding active value (the glyph generation system 106 only updates a single channel at each location of C.) In many implementations, where the glyph generation system 106 utilizes three channels (e.g., curves), at least two of the three channels of C at a certain location need to be updated to approach the ground truth due to the nature of the median operator. Accordingly, in some implementations, during the training stage, the glyph generation system 106 utilizes the differential approximation $\hat{F}(C)$, which includes the average of the median and the closest value to the median. In this manner, the glyph generation system 106 can update the two channels accordingly.

As mentioned above, in various implementations, the glyph generation system 106 utilizes the gradient loss 326 to accurately learn signed distance field values 312. For instance, in various implementations, the glyph generation system 106 utilizes the gradient loss 326 to constraint the output (e.g., signed distance field values 312) of the implicit network 310 to resemble a distance field such that implicit re-sampling resembles a closed continuous shape. In some cases, gradient loss 326 is a Eikonal loss. To illustrate, in one or more implementations, an Eikonal partial differential equation suggests that the solution to d(x, y; 0) must satisfy $\mathbb{E} \|\nabla d(x,y; \theta)\|=1$, where d(x,y; θ) denotes a simplified implicit model parameterized by θ. Additionally, since satisfying this constraint may not be completely necessary for the implicit network 310, in some implementations, the glyph generation system 106 loosens it to be greater than or equal to 1 as shown below in Equation 4, which intuitively encourages the function to be monotonic.

$$L_{gradient} = \begin{cases} \mathbb{E}|1 - \|\nabla d(x, y; \theta)\|_2| & \text{if} \|\nabla d(x, y; \theta)\|_2 < 1 \\ 0 & \text{if} \|\nabla d(x, y; \theta)\|_2 \geq 1 \end{cases} \quad (4)$$

In Equation 4, ‖•‖ may represent the |•| represents absolute values.

Finally, in one or more implementations, the total loss from the loss model 320 is represented as shown in Equation 5 below.

$$L_{total} = L_{global} + \alpha L_{local/corner} + \beta L_{gradient} + \gamma \|z\|_2 \quad (5)$$

In Equation 5, α, β, and γ represent weights to balance these terms during training. Further, the local loss or corner template loss 322 (e.g., $L_{local/corner}$) is shown below as Equation 6 and is described in connection with FIG. 4 below.

In various implementations, the glyph generation system 106 warms up the implicit network 310 prior to training. For instance, since gradients mainly fall into the anti-aliasing range, warming up or initializing the network can positively affect convergence. Accordingly, in various implementations, the glyph generation system 106 sets the initial anti-aliasing range as the entire image range, then slowly decreases or shrinks it to k·w$^{-1}$ during the training, where w is image width. In some cases, k is set to 4. In these implementations, the warm-up assists the model converge more consistently, and the estimated SDF (e.g., signed distance field values 312) is more consistent.

As noted above, in one or more implementations, the implicit network 310 may converge better for fonts with relatively small features when the glyph generation system 106 first initializes the aliasing range to the whole distance field range, (i.e., (−1, 1)) and then, slowly decreases it to desired values using the differential approximation mean function (e.g., $\hat{F}(C)$). In these implementations, the learned distance values are relatively smoother (e.g., using Laplacian to measure the smoothness of distance values with and without training).

As mentioned above, in Equation 1, the function g models the spatially-varying texture of the shape and is set to 1 when fonts are solid (e.g., black or other colored fonts). In some implementations, the glyph generation system 106 changes the spatially-varying texture of the shape by adjusting the value of g. Indeed, in one or more implementations, the glyph generation system 106 trains the implicit network 310 to reconstruct, generate, or interpolate glyphs having textured fonts by parameterizing the function g in Equation 1.

To illustrate, in some implementations, the glyph generation system 106 parameterizes the function g as an implicit neural network with a similar configuration as the distance values. However, unlike the implicit network 310 for d, the glyph generation system 106 utilizes a sine activation function, which can better model the high-frequency feature of texture in input images of glyphs.

Additionally, in these implementations, to account for several possible factorizations, the glyph generation system 106 adds two extra losses to the total loss function to encourage a minimal and smooth/continuous alpha mask. For example, the glyph generation system 106 adds an alpha loss (e.g., $L_{alpha}=\|C\|_1$) to encourage a minimal alpha mask. In some instances, the alpha loss may result in a grainy mask. Accordingly, the glyph generation system 106, in one or more implementations, adds a divergent loss ($L_{divergent}=\Delta d$) to minimize the divergence of the distance value to achieve a smoother and more continuous alpha mask. By adding these losses to the loss model 320, the glyph generation system 106 can effectively represent shapes for glyphs with internal texture (e.g., color, shading, patterns, gradients, or other texture).

Figure 4:
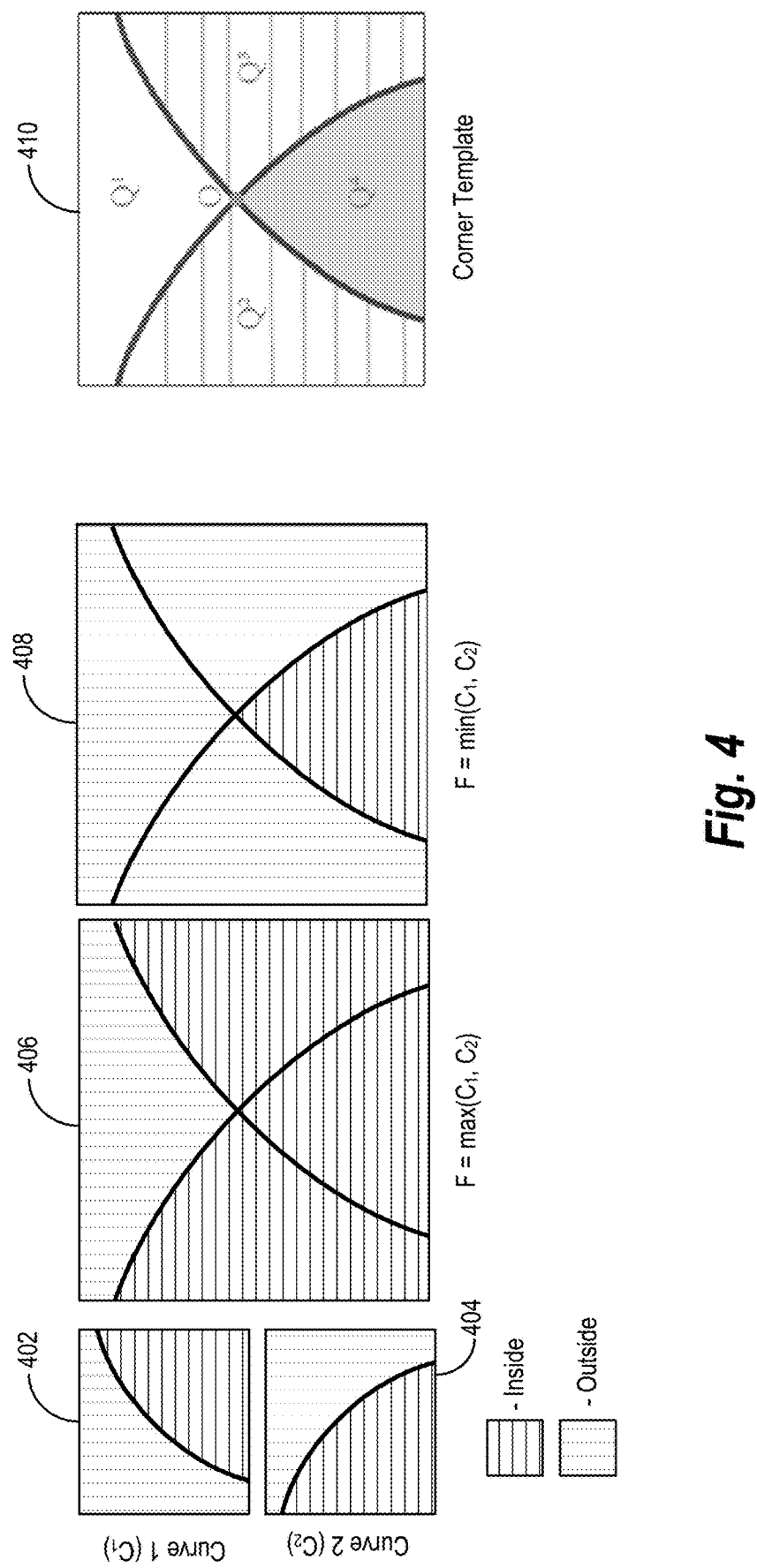
FIG. 4 illustrates a diagram of a corner template in accordance with one or more implementations.

Turning now to FIG. 4, additional detail is provided regarding utilizing a corner template and corner template loss. In particular, FIG. 4 illustrates a block diagram of a corner template 410 in accordance with one or more implementations. Indeed, in various implementations, the glyph generation system 106 utilizes a corner template 410 to efficiently and accurately achieve multi-curve representations for sharp glyph corners.

As provided above, details like sharp corners may be lost when upscaling bitmaps or signed distance field values with a single distance value. Accordingly, rather than directly modeling corners, in various implementations, the glyph generation system 106 represents corners as the intersection of multiple curves (e.g., lines or parabolas). Further, even though individual sub-curves may be smoothed after being encoded by a deep learning model, the sharpness of their intersection will be preserved.

More particularly, in various implementations, the glyph generation system 106 constructs sharp corners of input glyphs during training from multiple smooth curves predicted by the implicit network. Indeed, as described above, the glyph generation system 106 utilizes an implicit network trained to predict multiple distance values and a multi-curve representation model 314 and/or differentiable rasterization model 316 to rasterize the distance values to generate smooth curves and shapes decoupled from corners and edges. To illustrate, FIG. 4 shows a first curve 402 and a second curve 404 at the edge or corner of a glyph. As shown, the curves divide an inside portion from an outside portion of the glyph.

In various implementations, the glyph generation system 106 represents the shape F of a glyph as a set of curves $C=\{C_1, C_2, \ldots, C_n\}$ where $C_n$ is a binary map is indicating whether a pixel is located inside (i.e., 1) or outside (i.e., 0) the n-th curve (as shown in FIG. 4). In these implementations, $C_n=K(d_n)$, where $d_n$ represents the n-th SDF channel (e.g., the rasterized distance value) estimated by the implicit network. Additionally, in some implementations, if the glyph generation system 106 applies the median function (e.g., F(C)) over all curves (e.g., channels), the median function can fuse the curves to reconstruct the shape, preserving sharp corners.

As shown in FIG. 4, two curves (e.g., the first curve 402 and the second curve 404) are able to sufficiently represent either a convex or a concave corner by adopting the maximum or minimum of the median function. In particular, FIG. 4 shows a maximized median function 406 and a minimized median function 408. However, as provided above, to represent a glyph shape with arbitrary corners that includes both concave and convex angles, at least three curves are needed. For example, the glyph generation system 106 is able to model all corners in a glyph shape as $F=\min(\max(C_1, C_2), C_3)$. In some implementations, the glyph generation system 106 model corners in a glyph shape as $F=\max(\min(C_1, C_2), C_3)$.

In one or more implementations, the glyph generation system 106 sets n (e.g., number of curves) to three (i.e., $C=\{C_1, C_2, C_3\}$). Additionally, because deep models are often sensitive to the permutation of guidance signals during training, in one or more implementations, the glyph generation system 106 uses the median function F(C) to achieve sharp corners and permutational invariance with respect to the curve order.

As shown, FIG. 4 includes a corner template 410, which is based on the median function F(C) for three curves. In various implementations, the corner template 410 includes a corner represented as O. The corner template 410 also includes the intersection of the first curve 402 and the second curve 404 to divide the local space of the corner template 410 into four quadrants, shown as Q1, Q2, Q3, and Q4 (e.g., binary quadrants from binary maps surrounding the corner O). Indeed, in many implementations, the distribution of the channels (e.g., curves) along the four quadrants around a corner O makes up the corner template 410.

Moreover, in many implementations including the illustrated embodiment, the corner template 410 includes two opposite quadrants, where quadrant (i.e., Q1) is inside of the glyph and has corresponding F(C) values of 1 while the opposite quadrant (i.e., Q4) is outside of the glyph and has corresponding F(C) values of 0.

In one or more implementations, the remaining two quadrants (i.e., Q2 and Q3) are opposite of each other, but also have equal F(C) values. In particular, the remaining two quadrants have the same F(C) (i.e., median value) but from a different combination of channels (i.e., from different Cs). To illustrate, as shown, the values of $\{C_1, C_2, C_3\}$ corresponding to Q2 are (1, 0, 0), which results in a F(C) value of 0 for Q2. As noted above, the F(C) value for Q3 should be 0 as well. However, because the values of $\{C_1, C_2, C_3\}$ corresponding to Q3 must differ from those of Q2, the values of $\{C_1, C_2, C_3\}$ corresponding to Q3 are either (0, 1, 0) or (0, 0, 1).

Additionally, in these implementations, when F(C) for the remaining two quadrants (i.e., Q2 and Q3) equals 1, the corner O of the corner template 410 is a concave corner. Otherwise, if the remaining two quadrants have F(C) values of 0, the corner O of the corner template 410 is a convex corner.

As mentioned above, in various implementations, the glyph generation system 106 learns parameters for the implicit network (i.e., the implicit differentiable font neural network) based on the corner template 410. To elaborate, for local corner template loss based on a corner template 410, the glyph generation system 106 performs corner detection. In one or more implementations, the glyph generation system 106 defines a corner as a local where two curves intersect at an angle less than a threshold (e.g., 3 rad, 171-degrees, or another angle).

In some implementations, for each corner, the glyph generation system 106 generates the corner template 410. For example, in one or more implementations, the glyph generation system 106 generates a template size of 7×7 corresponding to an image size of 128×128. Further. In certain implementations, the glyph generation system 106 scales the corner template size based on the size of the input glyph image (without scaling the neighborhood sampling size for the global shape loss). In this manner, the glyph generation system 106 densely samples edges and corners of a glyph while allowing for a sparse sampling of homogeneous areas.

Further, in these or other implementations, to represent glyph corners as the intersection of two curves, the glyph generation system 106 supervises the corner samples utilizing corresponding corner templates. Because using the median function (e.g., F(C)) to perform rendering is invariant to the order of the rasterized distance values or channels, the corner template loss inherits the permutation invariance to the rasterized distance value or channel order. As a result, in one or more implementations, the glyph generation system 106 avoids unnecessarily constraining the network by only supervising Q2 and Q3 of the corner template 410 using the corner template loss 322.

As mentioned above, Equation 6 provides an example of corner template loss.

$$L_{local/corner} = \mathbb{E}_{O \in corner\ samples} \sum_{i=2}^{n} \min_{j \in \{2,\ldots,n\}} (C_i^O - T_j(O))^2 \quad (6)$$

In Equation 6, O represents a corner sample from a ground truth and n represents the number of channels (e.g., n=3 or more). In addition, the correspondingly predicted curves of the corner O are denoted by $C_i^O$. Further, the corresponding corner template 410 is represented as $T_j(O)$, where the n channels are indexed by j.

As described above, by utilizing corner template loss on the rendered distance values or curves, the glyph generation system 106 efficiently learns parameters for the implicit network to train the network to implicitly generate accurate distance values, which result in rendered glyphs and glyph sets that scale to any resolution while maintaining sharp edges and corners. Moreover, unlike some supervision techniques, such as canonical representation based on multi-scale deep fusion edge coloring encoding, utilizing local corner template supervision allows the glyph generation system 106 to train the implicit network 310 to learn a consistent canonical multi-channel representation in a continuous latent space.

Figure 5:
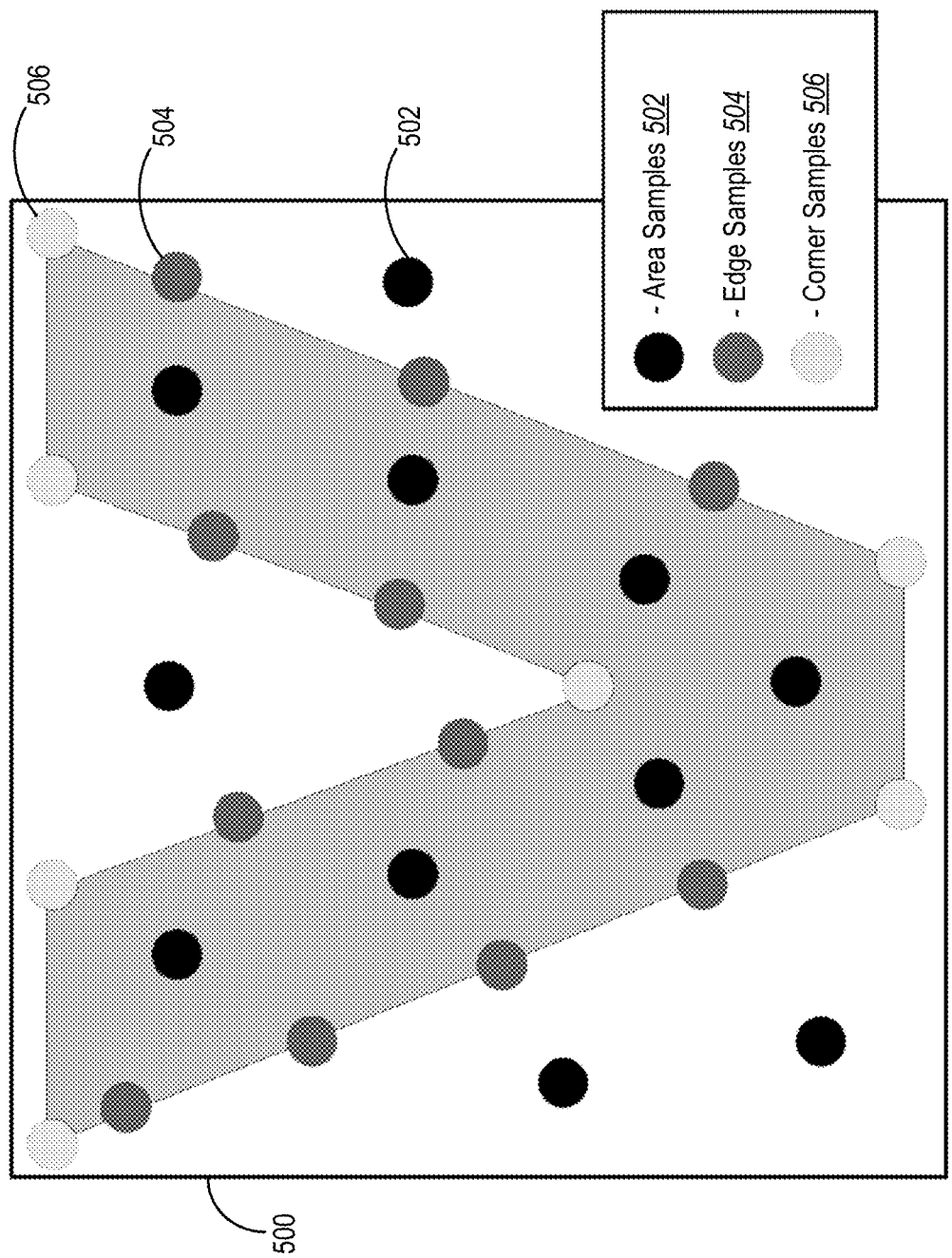
FIG. 5 illustrates a diagram of importance sampling in accordance with one or more implementations.

As noted above, FIG. 5 describes importance sampling. To illustrate, FIG. 5 shows a block diagram of importance sampling in accordance with one or more implementations. As shown, FIG. 5 includes an image of a glyph 500, where the glyph generation system 106 takes various samples of the glyph 500. For instance, the samples include area samples 502 that correspond to homogeneous areas inside and outside of the glyph 500, edge samples 504 that correspond to edges of the glyph 500, and corner samples 506 that correspond to corners of the glyph 500.

In various implementations, the glyph generation system 106 improves training efficiency by focusing on corners and edges of glyphs. In one or more implementations, this edge/corner-award sampling is referred to as importance sampling. To illustrate, in FIG. 5, the number of edge samples 504 and corner samples 506 outnumber the number of area samples 502, especially when the ratio of area to edges/corners is considered.

In some cases, importance sampling further motivates the use of implicit models such as the implicit network as importance sampling can significantly reduce the computational complexity for training on higher resolution shapes as compared the traditional training on grid images. To elaborate, consider an image of size 64×64, which includes around 4,096 pixels. Because only the most benefit is gained by evaluating glyph edges, rather than sampling 4,000 pixels across the image, the glyph generation system 106 can effectively train the implicit network using 1,200 pixels or less that are found at the corners and edges of the glyph rather than the known samples inside or outside of the glyph.

Indeed, in various implementations, the glyph generation system 106 increases training efficiency (especially over a large glyph scale) by performing importance sampling to reduce the overall number of location points used in training while still preserving the detailed structure of a glyph. For example, the glyph generation system 106 samples more locations in a higher density along boundaries and corners of a glyph and samples fewer locations in sparser density and background areas (not along boundaries or on the surface) of a glyph.

Figure 6A:
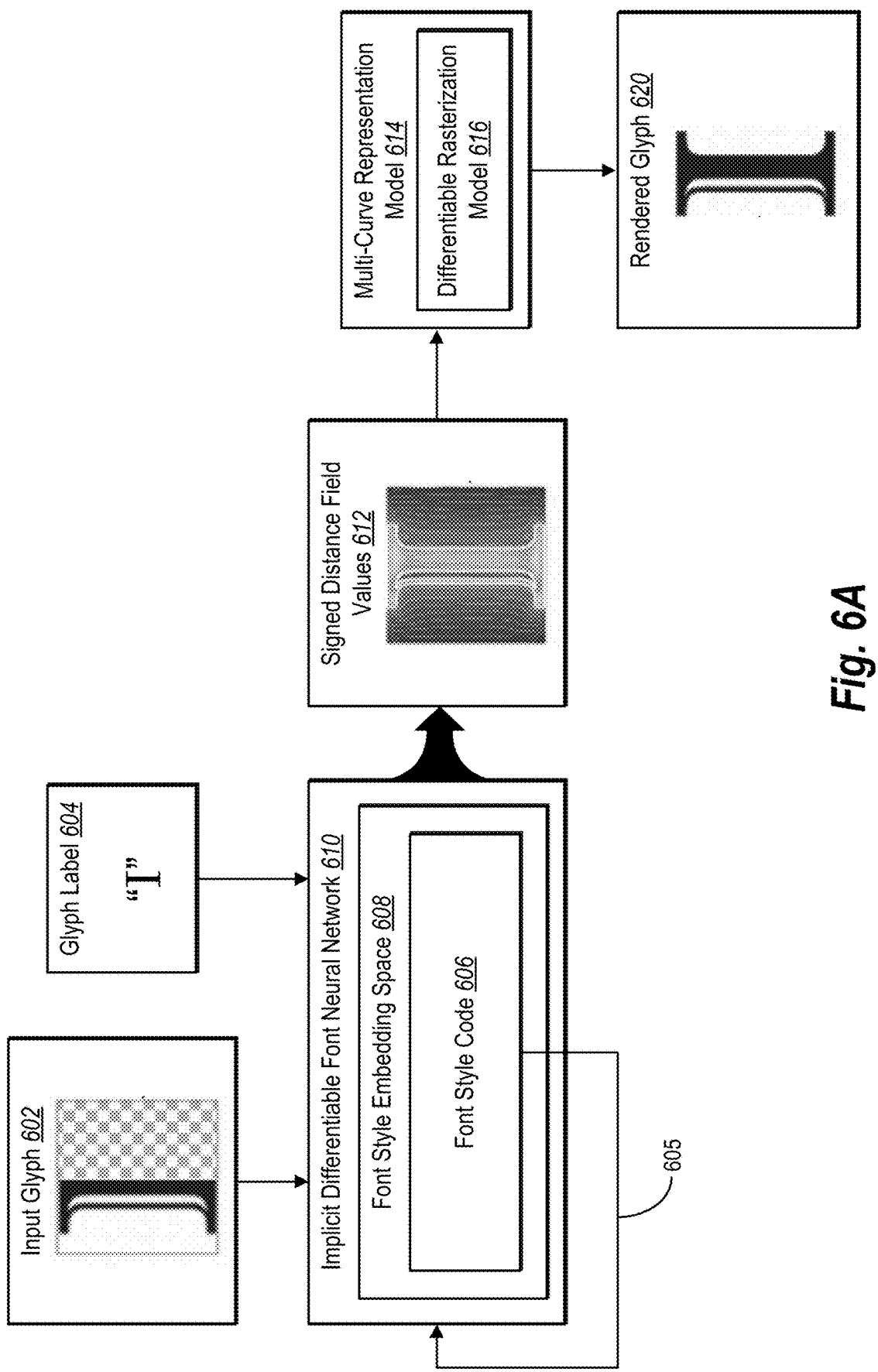
FIGS. 6A-6B illustrate block diagrams of reconstructing and generating glyphs utilizing the implicit differentiable font neural network in accordance with one or more implementations.
Figure 6B:
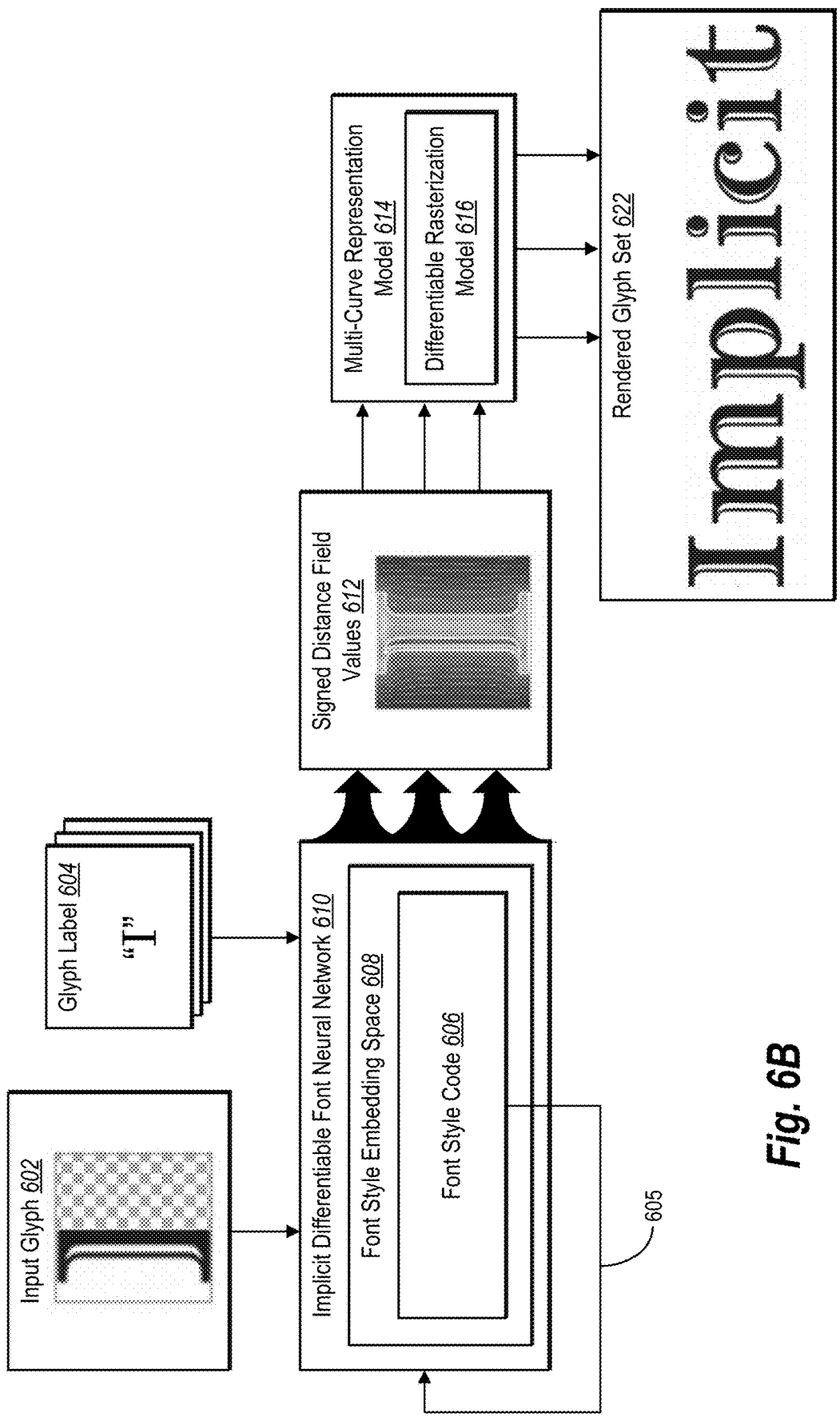
Figure 7B:
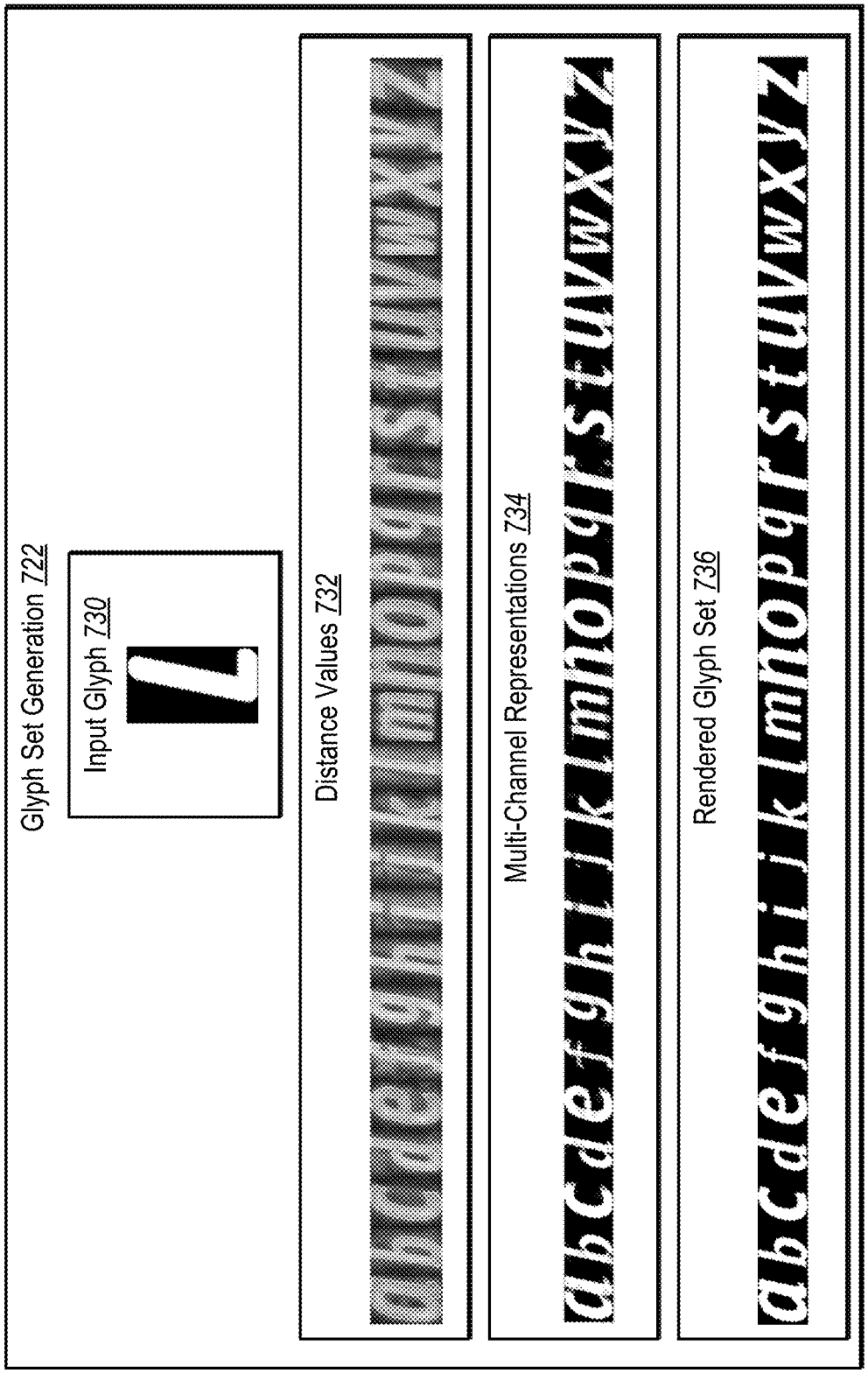
Figure 8:
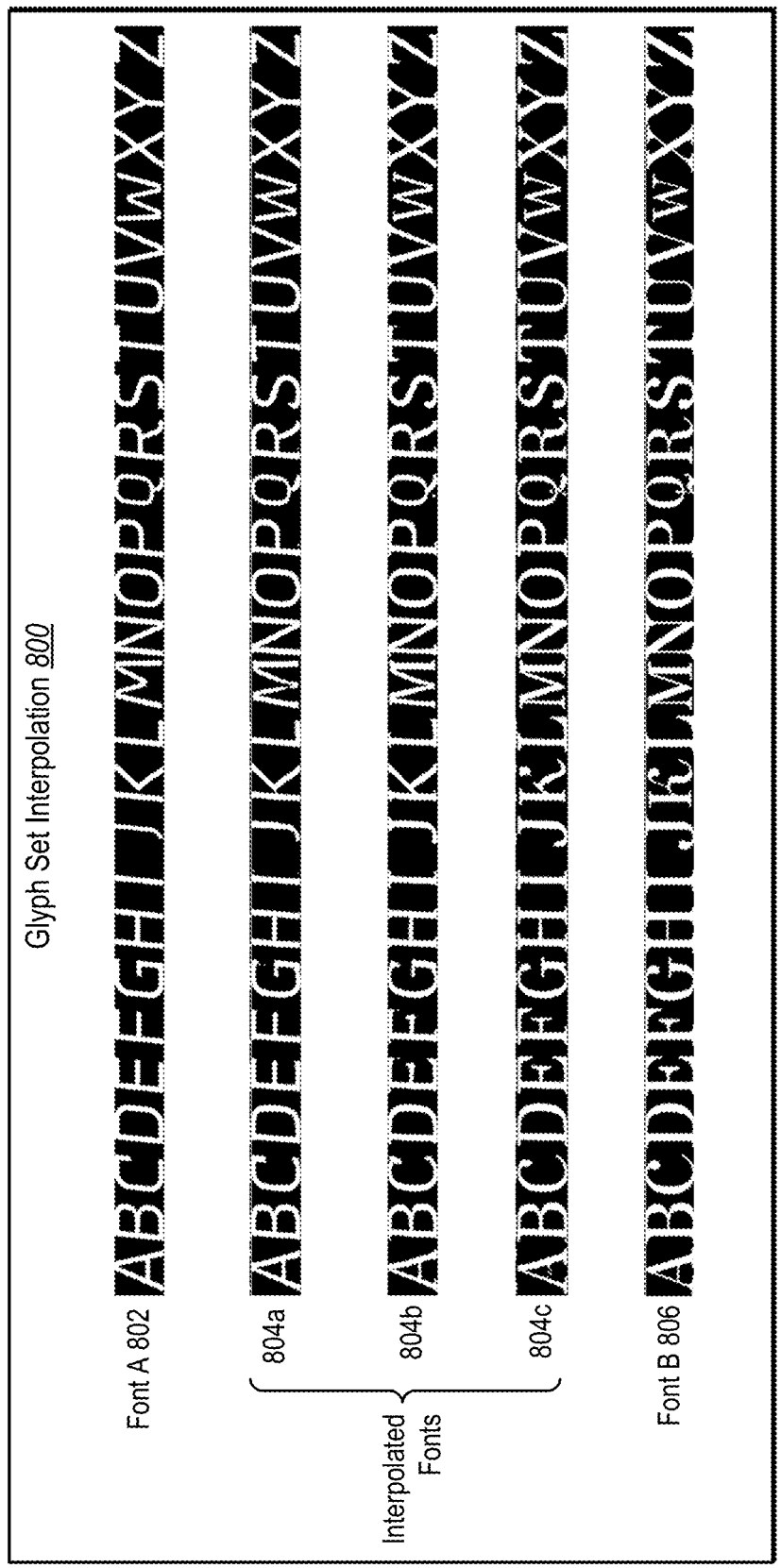
FIG. 8 illustrates a block diagram that includes an example of an interpolated glyph set generated by the implicit differentiable font neural network in accordance with one or more implementations.

Once the glyph generation system 106 trains the implicit network (i.e., the implicit differentiable font neural network) as described above, the glyph generation system 106 utilizes the generated implicit network to generate multi-implicit neural glyph representations of input glyphs. To illustrate, the next set of figures, FIGS. 6A-8, describe (and provide visual examples of) the glyph generation system 106 reconstructing, generating, and interpolating one more glyphs utilizing multi-implicit neural glyph representations. For example, FIGS. 6A-6B illustrate reconstructing and generating glyphs. FIGS. 7A-7B illustrates examples of a reconstructed glyph and a generated glyph set. FIG. 8 illustrates an example of an interpolated glyph set.

As just mentioned, FIGS. 6A-6B illustrate block diagrams of reconstructing and generating glyphs utilizing the implicit differentiable font neural network in accordance with one or more implementations. As shown, FIGS. 6A-6B include an input glyph 602 and corresponding glyph label 604. In addition, FIGS. 6A-6B include an implicit differentiable font neural network 610 (or simply "implicit network 610") having a font style embedding space 608. Of note, various components in FIGS. 6A-6B can correspond to, or be implementations of, related elements described above in connection with FIG. 3. For example, in one or more implementations, the implicit network 610 is an implementation of the trained implicit network 310 from FIG. 3.

FIG. 6A shows reconstructing an input glyph into a multi-implicit neural glyph representation. To illustrate, FIG. 6A shows the glyph generation system 106 utilizing the implicit network 610 to generate multiple signed distance field values 612 for the input glyph 602. As described above, the glyph generation system 106 os able to generate multiple distance values (e.g., three or more) for some or all of the pixel locations of the input glyph 602. Indeed, in some cases, given a location (e.g., a 2D spatial location (x, y), a glyph label (e.g., l), and a font style code (e.g., an embedding z that indicates a font style), the glyph generation system 106 generates a multi-implicit neural glyph representation of an input glyph.

In one or more implementations, the glyph generation system 106 first determines the font style code 606 for the input glyph 602. For example, the glyph generation system 106 maps the input glyph 602 to the font style embedding space 608 to determine a font style code (e.g., by comparing Euclidian distance and/or satisfying a matching distance threshold). In some implementations, the font style code 606 is a vector that includes 1s for vector entries corresponding to font styles that contribute to the makeup of a font style for an input glyph 602 and 0s for vector entries corresponding to font styles that do not contribute to the makeup of the font style for the input glyph 602. As shown by arrow 605, in various implementations, the glyph generation system 106 utilizes the font style code 606 to generate the signed distance field values 612 for the input glyph 602.

In some implementations, when inferencing the input glyph 602 with the implicit network 610, given that the input glyph 602 was unseen during training, the glyph generation system 106 first finds the optimal latent vector (i.e., font style code) that makes the rendered glyph 620 closest to the input glyph 602. More specifically, in one or more implementations, the glyph generation system 106 fixes the glyph label 604 based on the input glyph 602 and determines its font latent vector (e.g., font style code) by minimizing the distance between the raster of the input glyph 602 and a predicted glyph using gradient descent to determine an optimal font latent vector 2.

In addition to the font style code 606, the glyph generation system 106 can also utilize the glyph label 604 to generate the signed distance field values 612 for the input glyph 602. As mentioned above, in some implementations, the glyph generation system 106 determines the glyph label 604 automatically. In other implementations, the glyph generation system 106 extracts the glyph label 604 from metadata of the glyph 602. In one or more implementations, the glyph generation system 106 receives user input indicating the glyph label 604.

Based on the glyph label 604 and the font style code 606, the glyph generation system 106 generates the signed distance field values 612. For example, in various implementations, once the glyph generation system 106 determines the font style code 606, the glyph generation system 106 is able to use the implicit network 610 to generate multi-implicit neural glyph representations for any (or all) of the glyphs in a glyph to appear in the given font style. Accordingly, in these implementations, given one or more glyph labels, the glyph generation system 106 generates the signed distance field values 612 for the corresponding glyph character(s) in the given font style.

Further, as described above, in one or more implementations, the glyph generation system 106 utilizes the multi-curve representation model 614 and/or differentiable rasterization model 616 to rasterize the distance values of the input glyph 602 as well as combine the rasterized distance values to generate a rendered glyph 620 from the input glyph 602. For example, the differentiable rasterization model 616 utilizes the median function to render the multiple distance values (e.g., curves or channels) into a rasterized digital image portraying a multi-implicit neural glyph representation of the input glyph 602.

In some implementations, the glyph generation system 106 generates the rendered glyph 620 from a partial image of a glyph. A partial glyph refers to a representation of a glyph that is incomplete or missing one or more portions. For example, a partial glyph is missing various pixels that make the glyph appear incomplete. Conversely, a completed glyph refers to a glyph generated from a partial glyph and that is filled or completed utilizing the glyph appearance propagation model. A completed glyph includes generated pixels to fill or replace missing portions of a partial glyph. For instance, the input glyph 602 shows only a quarter, half, or less than all of a glyph. In these implementations, the glyph generation system 106 determines the font style code 606 from the partial glyph image (and its glyph label 604). Then, using the determined font style code 606 and the glyph label 604, the glyph generation system 106 generates the rendered glyph 620 (e.g., a rendered reconstructed glyph) as described above. A visual example of reconstructing a glyph is provided with respect to FIG. 7A below.

As noted above, in certain described implementations, the glyph generation system 106 scales glyphs without losing detail or degrading appearance. In particular, the glyph generation system 106 utilizes the implicit network 610 in connection with the multi-curve representation model 614 to generate glyphs in different (e.g., larger or smaller) scales without degrading the appearance of the glyphs.

While FIG. 6A describes reconstructing an input glyph, FIG. 6B corresponds to generating one or more additional glyphs (e.g., a glyph set) for an input glyph. To illustrate, FIG. 6B shows multiple glyph labels 604 being provided to the implicit network 610. For each of the multiple glyph labels 604, the glyph generation system 106 generates corresponding rendered glyphs, as described above. Indeed, FIG. 6B illustrates multiple arrows moving between the components and elements to represent generating the different glyphs.

Further, FIG. 6B includes the glyph generation system 106 providing the multiple different glyphs as a rendered glyph set 622 (e.g., a rendered generated glyph set). As shown, the rendered glyph set 622 includes different glyph characters and shapes having the same font style (e.g., the font style code 606 determined for the single input glyph 602) matching the font of an initial glyph. While the rendered glyph set 622 shows a limited number of glyphs, in various implementations, the rendered glyph set 622 includes an entire font collection of uppercase letters, lowercase letters, numbers, symbols, and/or special characters. A visual example of generating a glyph set is provided with respect to FIG. 7B below.

In some implementations, the glyph generation system 106 and/or a user provides multiple glyph labels 604 to the implicit network 610. For example, the glyph generation system 106 detects user input specifying glyph labels for characters in a word or sentence. In another example, the glyph generation system 106 detects user input specifying a subset of glyphs to include in a glyph set (e.g., 52 glyph labels for a complete English alphabet glyph set and/or additional glyph labels for numbers). In some implementations, the implicit network 610 maintains one or more lists of characters to include in a glyph set, ranging from commonly used glyphs to all possible glyphs and/or foreign language glyphs.

In one or more implementations, the glyph generation system 106 performs a step for generating a resolution-independent representation of the glyph based on sets of multiple signed distance field pixel values for pixels of the glyph and the font style code. The above description of FIGS. 3-6B, particularly the description of the acts involved in generating signed distance field values, rasterizing those distance values, and combining the rasterized distance values as described in relation to FIGS. 3 and 6A, provide various implementations and supporting acts and algorithms for performing a step for generating a resolution-independent representation of the glyph based on sets of multiple signed distance field pixel values for pixels of the glyph and the font style code.

In one or more implementations, the glyph generation system 106 determines a font style code for a glyph identified from a first digital image (e.g., an input glyph), as described above. In additional implementations, the glyph generation system 106 also generates a second digital image of a glyph (e.g., the input glyph) utilizing the resolution-independent representation (e.g., rasterized distance values, curves, or channels) of the glyph. For example, in some implementations, the glyph generation system 106 utilizes a median function for generating a digital image of the glyph from the resolution-independent representation of the glyph.

As mentioned above, FIG. 7A provides a visual example of glyph reconstruction 700. In particular, FIG. 7A illustrates a block diagram reconstructing an input glyph in accordance with one or more implementations. As shown, FIG. 7A includes an input glyph 702, a glyph label 704, and a rendered glyph 720, similar to corresponding elements introduced above.

In addition, FIG. 7A provides visual examples of intermediary elements corresponding to reconstructing and/or generating a multi-implicit neural glyph representation from a low-quality/low resolution rasterized input glyph. To illustrate, FIG. 7A includes distance values 712 (e.g., signed distance field values) generated by a trained implicit differentiable font neural network. As shown, the distance values 712 includes shaded pixels corresponding to how far the pixel is from the nearest boundary for the input glyph as well as if the pixel is located inside or outside of the glyph. In some implementations, the distance values 712 correspond to multiple distance values for each pixel location of the glyph.

Additionally, FIG. 7A includes multiple channels generated from the distance values 712. As described above, in various implementations, the glyph generation system 106 utilizes a multi-curve representation model to raster each set of distance values 712. As also noted above, the glyph generation system 106 commonly generates three or more sets of distance values 712 per location. Accordingly, FIG. 7A shows a first channel 714a, a second channel 714b, and a third channel 714c corresponding to the glyph generation system 106 rendering the three sets of distance values 712 generated by an implicit network for the glyph 702.

As shown, each of the three channels portrays a slightly different shape of a "k" glyph. These variations are further evidenced when combining the channels into a multi-channel 716, which shows different shading where the three channels differ. As described above, in one or more implementations, the glyph generation system 106 utilizes a median function to render the rendered glyph 720 from the three channels and/or multi-channel 716.

As mentioned above, FIG. 7B provides a visual example of the glyph set generation 722. In particular, FIG. 7B illustrates a block diagram generating a glyph set from an input glyph in accordance with one or more implementations. As shown, FIG. 7B includes an input glyph 730, distance values 732, multi-channel representations 734, and a rendered glyph set 736, similar to corresponding elements introduced above.

In various implementations, as mentioned above, the glyph generation system 106 does not need a glyph label as input when generating a glyph set as the glyph generation system 106 will apply multiple known glyphs labels. For example, after determining a font style code from the glyph 730, the glyph generation system 106 generates a rendered glyph set 736 of a complete alphabet glyph set matching the given font style based on predetermined glyph labels.

As shown, FIG. 7B includes the distance values 732 showing signed distance field values for each glyph in a glyph set. Additionally, FIG. 7B includes the multi-channel representations 734 for each glyph in the glyph set. Generating the distance values 732 and the multi-channel representations 734 for glyphs in the glyph set is described above.

As mentioned above, FIG. 8 corresponds to interpolating a glyph set. In particular, FIG. 8 illustrates a block diagram that includes an example of an interpolated glyph set generated by the implicit differentiable font neural network in accordance with one or more implementations. As shown, the glyph set interpolation 800 in FIG. 8 includes a first font 802 (i.e., "Font A") and a second font 806 (i.e., "Font B").

As mentioned above, the glyph generation system 106 can interpolate between two or more font styles to generate glyphs having a new and unknown font style. For instance, in one or other implementations, the glyph generation system 106 interpolates between the known font styles to generate or determine hybrid font styles that are amalgamations or combinations of multiple known font styles (in some proportions). For example, the glyph generation system 106 interpolates between two known font styles to generate a font style code that has some visual traits of one font style and other visual traits of another font style (e.g., for a font that is halfway between the two font styles). As another example, the glyph generation system 106 interpolates between font styles in different portions to generate a font style code that represents a font that is 80% of a first font style and 20% of a second font style (e.g., utilizing proportional weighting of features of the font styles).

To illustrate, FIG. 8 shows three interpolated fonts 804a, 804b, and 804c that transition from the first font 802 to the second font 806. For example, the second interpolated font 804b is a halfway mix between the first font 802 to the second font 806. Further, the first interpolated font 804a is weighted more toward features of the first font 802 and the third interpolated font 804c is weighted more toward features of the second font 806.

In various implementations, the glyph generation system 106 represents the font style code for an interpolated glyph as an operation of known font styles. For example, the glyph generation system 106 generates a font style code that is three parts Font A plus two parts Font B. As another example, the glyph generation system 106 generates a font style code that is two parts Font *A minus* one part Font B.

In certain implementations, the glyph generation system 106 generates a new font or glyph shape (e.g., a font not included in training data or a set of anchor fonts) from a font style code. For example, the glyph generation system 106 generates a font style code (e.g., a font style code vector) including values at particular entries corresponding to respective font styles. In some cases, the font style code includes Os and is at the different entries, where is indicate font styles that contribute to the font of the initial glyph. In other cases, the font style code includes values between 0 and 1 (e.g., 0.3, or 0.7) for entries corresponding to respective font styles, where the various entry values represent contribution weights or contribution measures for the respective font styles. Thus, in some implementations, the glyph generation system 106 combines the values of the entries in the font style code to determine a new font style (e.g., by combining the font styles according to their indicated contribution weights) for the input glyph.

In one or more implementations, the glyph generation system 106 determines that an input glyph has a font style code that corresponds to an interpolated font rather than any particular font style when inferencing the input glyph. For example, the implicit differentiable font neural network maps the font style of the input glyph that is away from any known font style (e.g., beyond a matching threshold distance). For instance, the input glyph is a custom-made font of a lowercase "h." In these implementations, the glyph generation system 106 can determine a font style code that proportionally weights known font styles corresponding to the mapped location in the font style embedding space.

Turning now to FIGS. 9A-12, additional detail is provided regarding both qualitative and quantitative comparisons between implementations of the glyph generation system 106 described herein and state-of-the-art systems. For example, FIGS. 9A-9B correspond to comparing font-specific discontinuities in corners, FIG. 10 corresponds to comparing reconstructed glyphs, FIG. 11 corresponds to comparing generated glyph sets, and FIG. 12 corresponds to comparing interpolated glyphs.

As mentioned above, FIGS. 9A-9B illustrate qualitative results comparing one or more implementations of the glyph generation system with a state-of-the-art system with respect to font-specific discontinuities in corners. For context, state-of-the-art system discussed in these figures include font editing systems from in *Auto-Encoding Variational Bayes* by D. Kingma et al., found at arXiv preprint arXiv: 1312.6114, 2013 (hereafter "ImageVAE"); *DeepSVG: A Hierarchical Generative Network For Vector Graphics Animation* by A. Carlier et al., found at arXiv preprint arXiv: 2007.11301, 2020 (hereafter "DeepSVG"); *Im2Vec: Synthesizing Vector Graphics Without Vector Supervision* by P. Reddy et al., found at arXiv preprint arXiv:2102.02798, 2021 (hereafter "Im2Vec"); and *Attribute2Font: Creating Fonts You Want From Attributes* by Z. Wang et al., found at ACM Trans. Graph., 2020, (hereafter "Attr2Font").

Figure 9A:
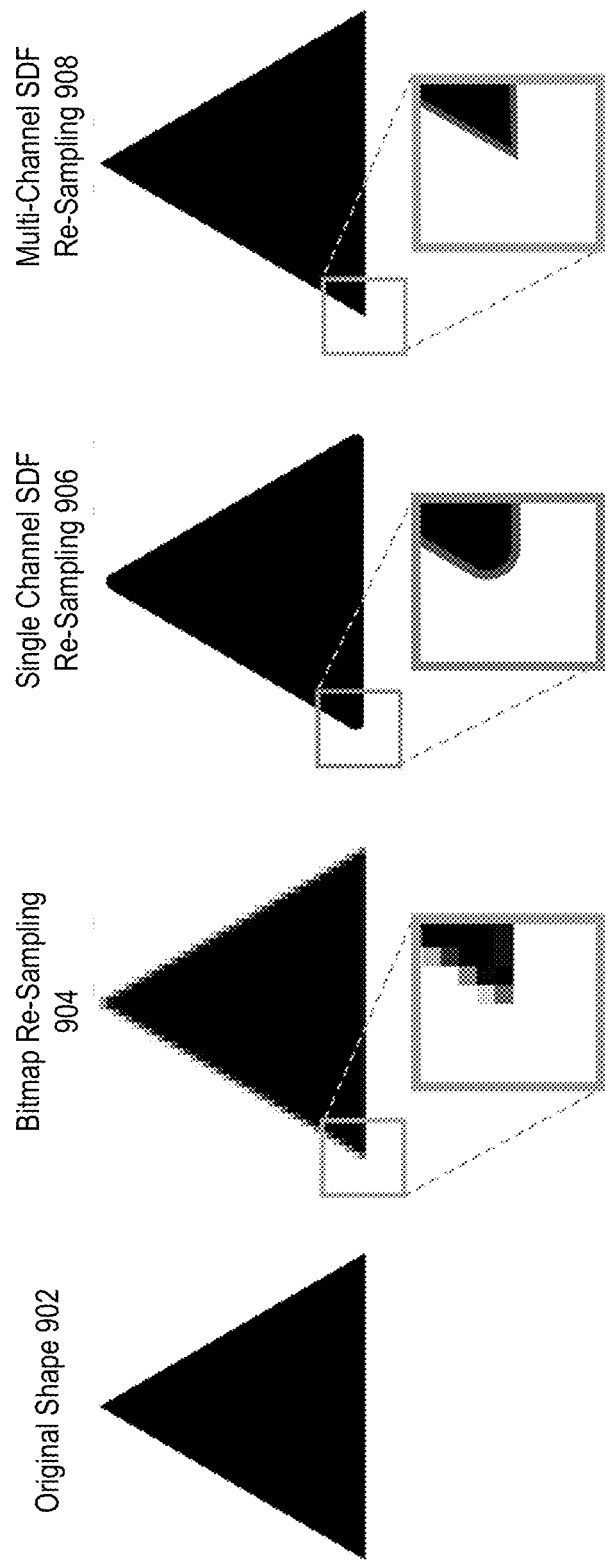
FIGS. 9A-9B illustrate qualitative results comparing one or more implementations of the glyph generation system with a state-of-the-art system with respect to font-specific discontinuities in corners.

Turning to FIG. 9A, this figure includes different versions of a triangle. As shown, the versions of the triangle include an original shape 902, a bitmap re-sampling 904, a single channel SDF resampling 906, and a multi-channel SDF re-sampling 908. The multi-channel SDF re-sampling 908 corresponds to one or more implementations of the glyph generation system 106 described above.

In general, the multi-channel SDF re-sampling refers to an implicit differentiable font neural network that has been trained with a corner template loss function, which focuses the implicit network on accurately learning corner and edge sharpness. Accordingly, using the trained implicit network, the glyph generation system 106 generates multiple implicit signed distance field values (SDF values) by sampling pixel locations of an input glyph (in this case, a triangle), rasterizing and combining the SDF values into a multi-channel representation, and combining the multi-channel representation into a rendered glyph to generate the multi-channel SDF re-sampling 908 shown in FIG. 9A.

As shown, the multi-channel SDF re-sampling 908 includes sharp reconstructed corners with low reconstruction error. In addition, the corner of the multi-channel SDF re-sampling 908 remains sharp and clear as the triangle is magnified and/or enlarged. In contrast, the bitmap re-sampling 904 includes pixelated and alias edges and corners. Additionally, the single-channel SDF resampling 906 is less pixelated, but the corner is well rounded. Further, as the triangle is enlarged, the corner further rounds.

Figure 9B:
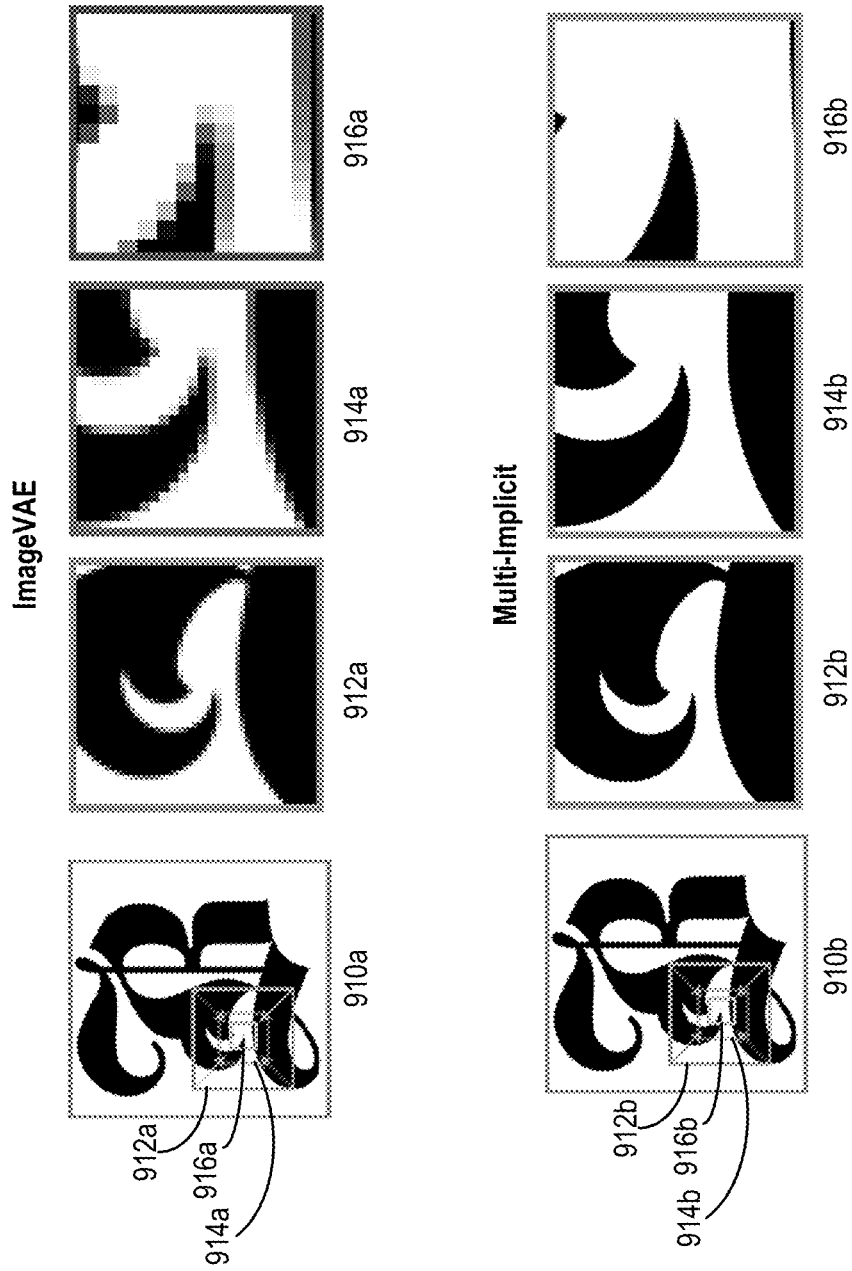

Looking now to FIG. 9B, this figure compares qualitative results between one or more implementations of the glyph generation system (e.g., labeled as "Multi-Implicit") and a state-of-the-art font editing system (e.g., ImageVAE). As shown, FIG. 9B includes the ImageVAE generating a rendered glyph 910a and the glyph generation system 106 (e.g., "Multi-Implicit") generating the same rendered glyph 910b.

At normal zoom, both rendered glyphs appeal similar at lower resolutions, such as a training resolution. However, upon zooming in to higher resolutions, the ImageVAE rendered glyph becomes pixelated and aliased. In contrast, the glyph generation system 106 remains sharp and clear at higher resolutions. To illustrate, FIG. 9B shows the ImageVAE glyph at a first magnified resolution 912a, a second magnified resolution 914a, and a third magnified resolution 916a, each of which corresponds to zoom windows on shown over the ImageVAE rendered glyph 910a. The glyph generation system 106 includes corresponding magnified glyphs including a first magnified resolution 912b, a second magnified resolution 914b, and a third magnified resolution 916b. Comparing the third magnified resolution images of the glyphs, the evidence shows that the glyph generation system 106 maintains anti-aliased, non-pixelated corners, edges, and curves while pixels the ImageVAE glyph becomes blurry and scattered at magnified resolutions.

Figure 10:
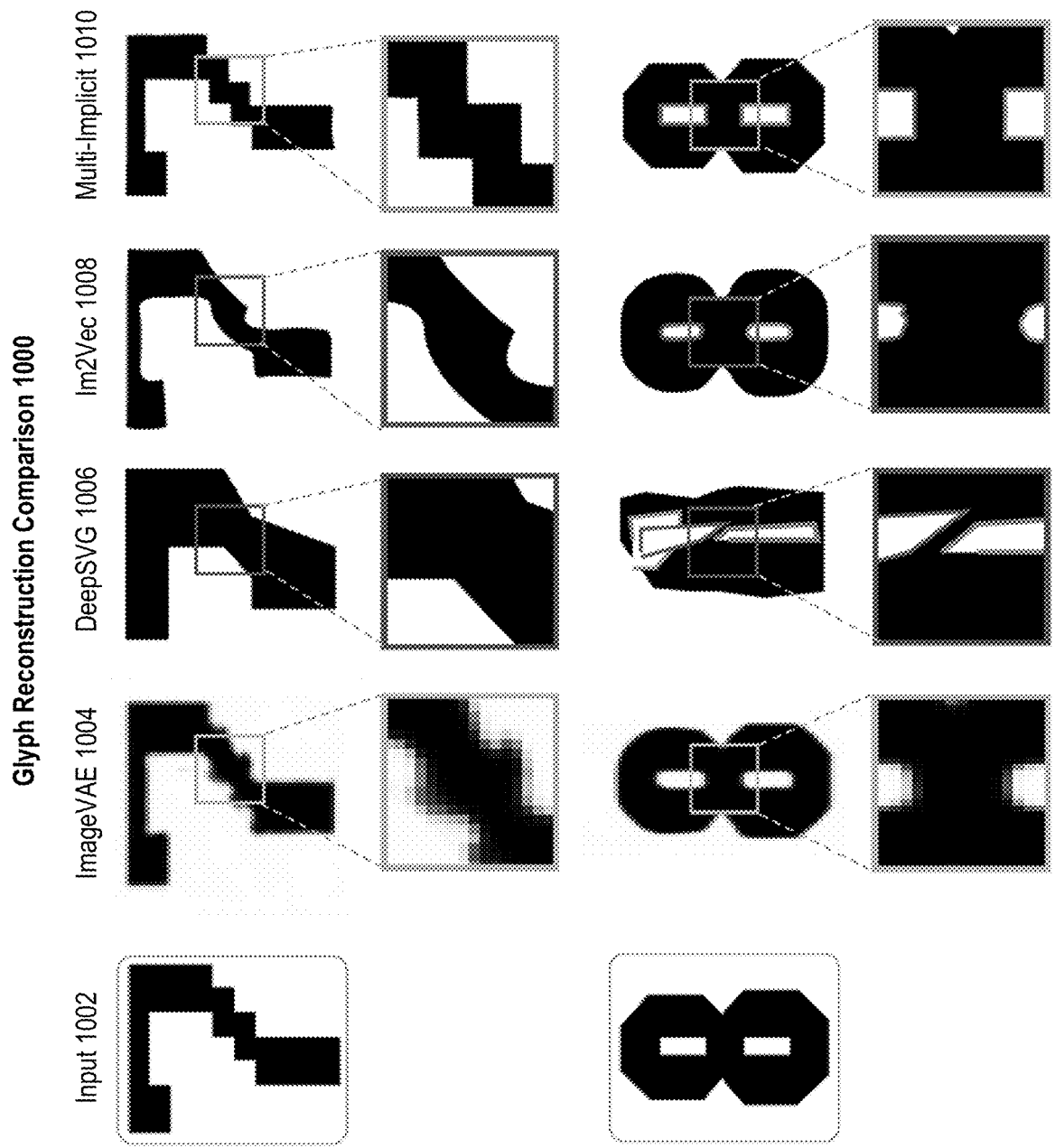
FIG. 10 illustrates qualitative results comparing one or more implementations of the glyph generation system with state-of-the-art systems with respect to reconstructing glyphs.

FIG. 10 illustrates qualitative results comparing one or more implementations of the glyph generation system with multiple state-of-the-art systems with respect to glyph reconstruction. In particular, the glyph reconstruction comparison 1000 in FIG. 10 includes inputs 1002 (i.e., input glyphs for a number 7 character and a number 8 character) and corresponding reconstructed glyphs by various state-of-the-art systems, such as ImageVAE 1004, DeepSVG 1006, and Im2Vec 1008. The glyph reconstruction comparison 1000 also includes reconstructed glyphs from an example implementation of the glyph generation system 106, shown as Multi-Implicit 1010. As shown in the reconstructed glyphs and especially at magnified resolutions, the state-of-the-art systems perform poorly compared to the glyph generation system 106 with respect to corner and edge sharpness. Further, the reconstructed glyphs of an example implementation of the glyph generation system 106 maintain the same glyph shape as the input while the state-of-the-art systems fail to resemble the input 1002.

More particularly, as shown, ImageVAE 1004 is unable to preserve sharp boundaries and corners as compared to the other systems. Additionally, because DeepSVG 1006 and Im2Vec 1008 directly output vectors, they can render shapes with clear boundaries. However, as shown, both systems are limited in capturing the global shapes as compared to the example implementation of the glyph generation system 106. Another advantage of the glyph generation system 106 approach over DeepSVG 1006 and Im2Vec 1008 is that the glyph generation system 106 learns a smoother latent space.

Along with the qualitative results shown in FIG. 10, quantitative evaluations were also performed. For example, researchers evaluated an example implementation of the glyph generation system 106 against the state-of-the-art systems against the task of glyph reconstruction, generation, and interpolation. For instance, the researchers evaluated for metrics of mean squared error (MSE) and soft intersection of union (s-IoU) at different resolutions. For reference, a smaller MSE score is better while a larger s-IoU score is better.

Table 1 below shows quantitative results of comparing state-of-the-art systems on reconstructing training samples at different resolutions.

TABLE 1

| | MSE ↓ (from 128 px to 1024 px) | | | | s-IoU ↑ (from 128 px to 1024 px) | | | |
|---|---|---|---|---|---|---|---|---|
| Methods | 128 | 256 | 512 | 1024 | 128 | 256 | 512 | 1024 |
| ImageVAE | 0.0072 | 0.0120 | 0.0160 | 0.0186 | 0.8252 | 0.8416 | 0.8482 | 0.8494 |
| DeepSVG | 0.1022 | 0.1081 | 0.1108 | 0.1121 | 0.3073 | 0.3124 | 0.3162 | 0.3164 |
| Im2Vec | 0.0435 | 0.0518 | 0.0557 | 0.0571 | 0.7279 | 0.7293 | 0.7294 | 0.7294 |
| Multi-Implicit | 0.0118 | 0.0170 | 0.0201 | 0.0218 | 0.8750 | 0.8978 | 0.9035 | 0.9049 |

As shown in Table 1, the glyph generation system 106 (i.e., Multi-Implicit) outperforms the others on s-IoU, indicating better reconstruction of the glyph shapes. In addition, the glyph generation system 106 generally performs better on MSE except for ImageVAE because ImageVAE trains to aligns with the MSE metric. However, as shown in FIG. 10, the reconstructed glyphs for ImageVAE 1004 show inaccurate and blurry shapes.

Figure 11:
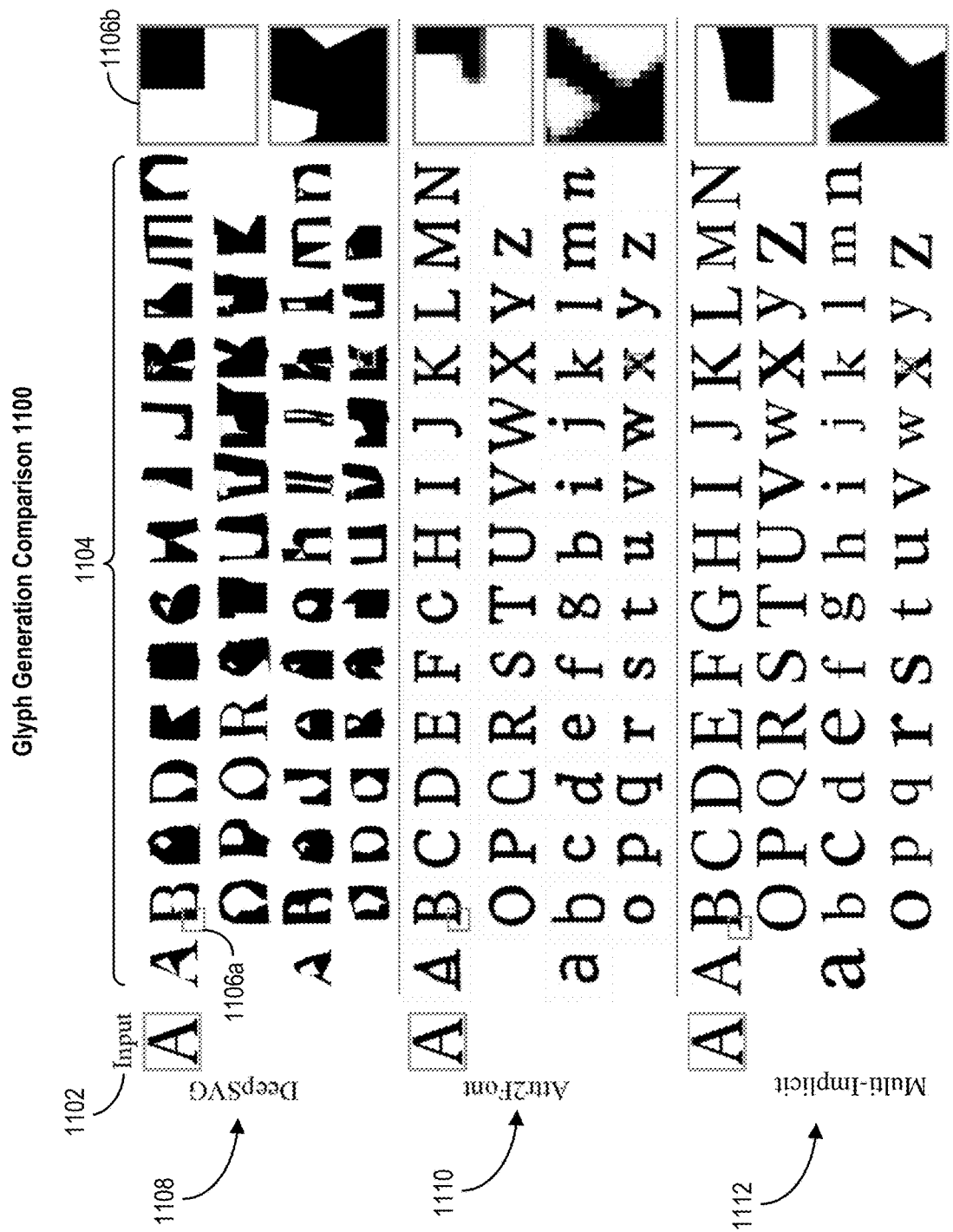
FIG. 11 illustrates qualitative results comparing one or more implementations of the glyph generation system with state-of-the-art systems with respect to generating glyph sets.

FIG. 11 illustrates qualitative results comparing one or more implementations of the glyph generation system with state-of-the-art systems (e.g., baseline systems) with respect to generating glyph sets. In particular, the glyph generation comparison 1100 in FIG. 11 includes inputs 1102 (i.e., input glyphs for the uppercase letter a) and corresponding glyph sets 1104 generated by various state-of-the-art systems, such as Deep SVG 1108, and Attr2Font 1110. In addition, the glyph generation comparison 1100 also includes a glyph set generated by an example implementation of the glyph generation system 106, shown as Multi-Implicit 1112. Further, the glyph generation comparison 1100 also includes zoom-in boxes 1106a over portions of the glyph set 1104 and corresponding magnified resolution boxes 1106b shown on the right of FIG. 11.

As shown, the glyph generation comparison 1100 compares font completion results between the state-of-the-art systems and implementation of the glyph generation system 106, where a glyph "A" is given with an unseen font style. As also, shown in the glyph sets 1104 and, in particular, at magnified resolutions, the state-of-the-art systems again perform poorly compared to the glyph generation system 106 with respect to corner and edge sharpness. As with glyph reconstruction, the glyph generation system 106 maintains the same glyph shape as the input while the state-of-the-art systems fail to resemble the input 1002 with respect to generating glyph sets.

More particularly, examples of the glyph generation system 106 outperform the state-of-the-art systems in terms of global glyph shape as well as boundary and corner sharpness. In general, raster-based methods (e.g., Attr2Font) tend to generate better shape but become blurry at corners. By contrast, vector-based methods (e.g., DeepSVG) eliminate the blurry effect but struggle to achieve accurate global glyph shapes. These state-of-the-art systems trade-off between accurate global shapes or accurate local corners. In contrast, the glyph generation system 106 achieves both accurate shapes and accurate corners.

Table 2 below provides statistical results that further demonstrates the superior generation capacity of the glyph generation system 106. In particular, Table 2 shows quantitative results of comparing state-of-the-art systems on font generation tasks at different resolutions.

TABLE 2

| | MSE ↓ (from 128 px to 1024 px) | | | | s-IoU ↑ (from 128 px to 1024 px) | | | |
|---|---|---|---|---|---|---|---|---|
| Methods | 128 | 256 | 512 | 1024 | 128 | 256 | 512 | 1024 |
| DeepSVG | 0.2597 | 0.2768 | 0.2854 | 0.2911 | 0.3584 | 0.3613 | 0.3651 | 0.3672 |
| Attr2Font | 0.2004 | 0.2231 | 0.2481 | 0.2563 | 0.6204 | 0.6451 | 0.6523 | 0.6560 |
| Multi-Implicit | 0.0946 | 0.1027 | 0.1065 | 0.1083 | 0.8429 | 0.8462 | 0.8469 | 0.8471 |

Figure 12:
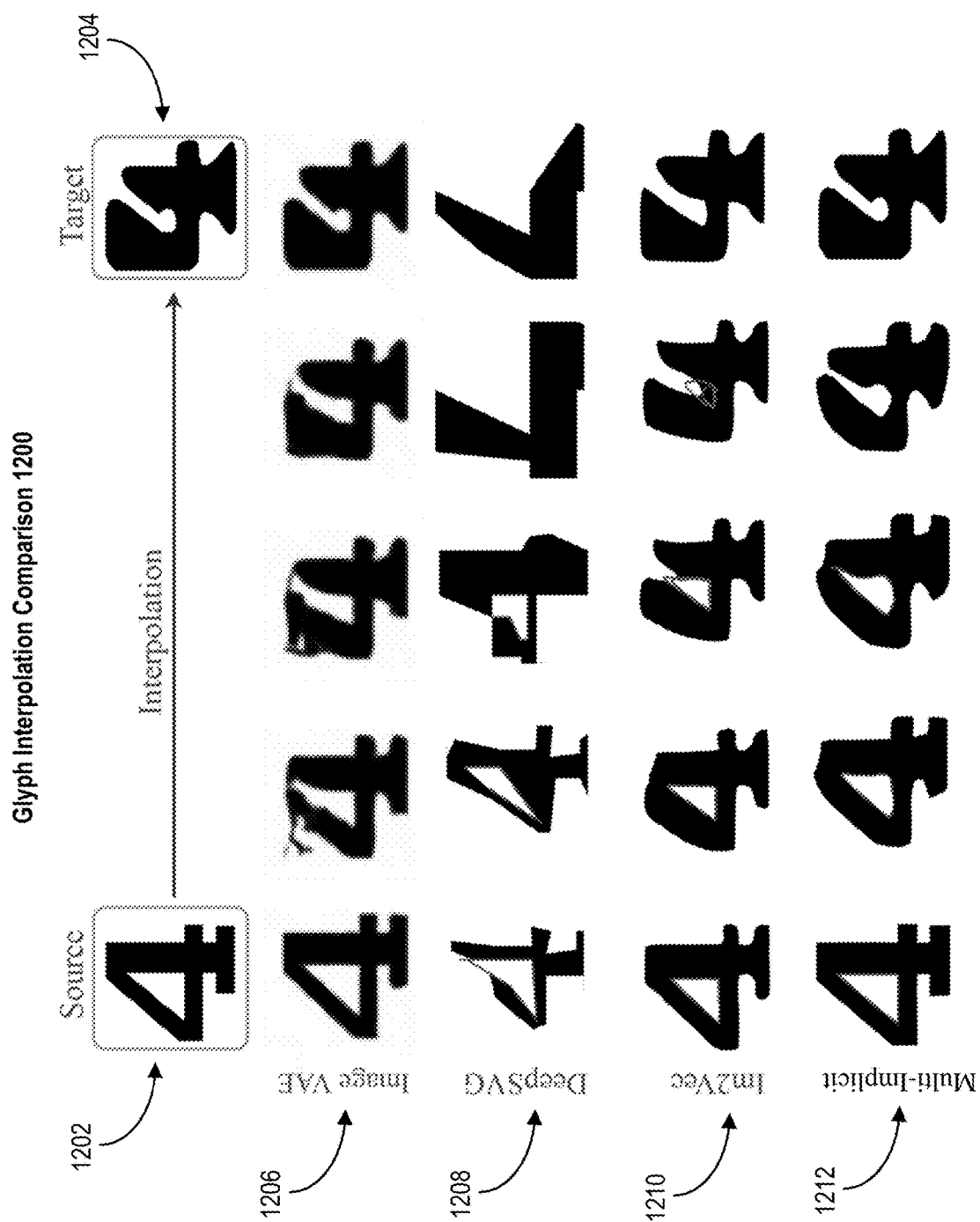
FIG. 12 illustrates qualitative results comparing one or more implementations of the glyph generation system with state-of-the-art systems with respect to interpolating glyphs.

FIG. 12 illustrates qualitative results comparing one or more implementations of the glyph generation system with state-of-the-art systems (e.g., baseline systems) with respect to glyph interpolation. For instance, the glyph interpolation comparison 1200 in FIG. 12 includes a source 1202 (e.g., source font style) and a target 1204 (e.g., target font style) for the input glyphs for the number 4 in two randomly selected font styles. The glyph interpolation comparison 1200 also shows interpolations of a glyph set resulting from various state-of-the-art systems, such as ImageVAE 1206, DeepSVG 1208, and Im2Vec 1210. In addition, the glyph interpolation comparison 1200 also includes an interpolation of a glyph set generated by an implementation of the glyph generation system 106, shown as Multi-Implicit 1212.

As shown, the implementation of the glyph generation system 106 outperforms the state-of-the-art systems with respect to interpolation glyph sets. For example, the ImageVAE 1206 shows blurry shapes during interpolation. The DeepSVG 1208 and Im2Vec 1210 show clearer interpolated glyphs, but are inconsistent in capturing the global shapes both in interpolation and for the target glyph. Moreover, while not shown, when interpolating between more complex glyph shapes, the state-of-the-art systems further struggle compared to the glyph generation system 106.

Table 3 below provides quantitative results of comparing state-of-the-art systems on interpolation at different resolutions. As with Table 1, ImageVAE appears to outperform the glyph generation system 106 because ImageVAE trains to aligns with the MSE metric; however, as shown in FIG. 12, ImageVAE 1004 results in blurry shapes and poor glyphs in interpolation.

TABLE 3

| Methods | MSE ↓ (from 128 px to 1024 px) | | | | s-IoU ↑ (from 128 px to 1024 px) | | | |
| --- | --- | --- | --- | --- | --- | --- | --- | --- |
| | 128 | 256 | 512 | 1024 | 128 | 256 | 512 | 1024 |
| Image VAE | 0.0181 | 0.0183 | 0.0185 | 0.0185 | 0.7715 | 0.7721 | 0.7731 | 0.7734 |
| DeepSVG | 0.0544 | 0.0556 | 0.0569 | 0.0575 | 0.6337 | 0.6347 | 0.6365 | 0.6372 |
| Im2Vec | 0.0434 | 0.0445 | 0.0463 | 0.0473 | 0.7213 | 0.7218 | 0.7232 | 0.7238 |
| Multi-Implicit | 0.0279 | 0.0297 | 0.0316 | 0.0343 | 0.8181 | 0.8184 | 0.8222 | 0.8234 |

Figure 13:
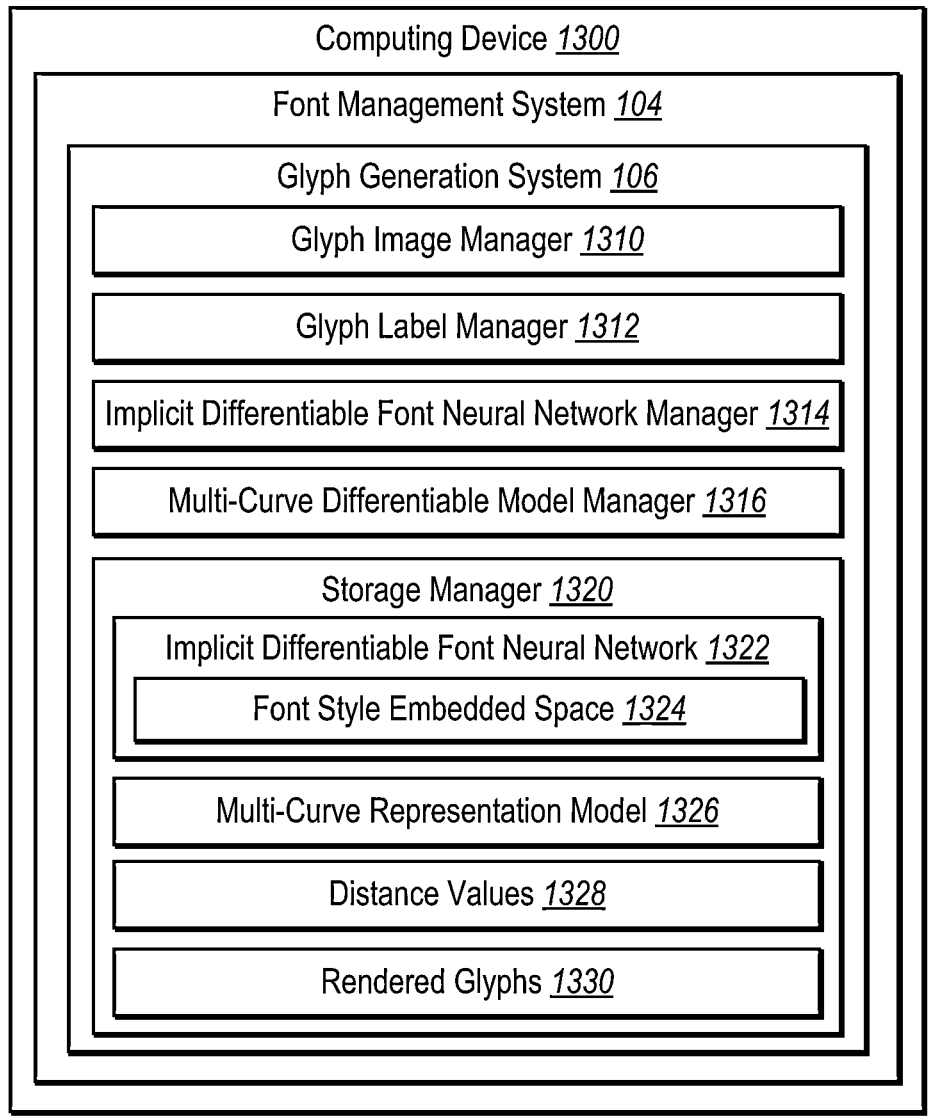
FIG. 13 illustrates a schematic diagram of the glyph generation system on a computing device in accordance with one or more implementations.

Looking now to FIG. 13, additional detail will be provided regarding components and capabilities of the glyph generation system 106. Specifically, FIG. 13 illustrates an example schematic diagram of the glyph generation system 106 on a computing device 1300 (e.g., one or more of the server(s) 102 and/or the client devices 108). In some implementations, the computing device 1300 refers to a distributed computing system where different managers are located on different devices, as described above.

As shown in FIG. 13, the glyph generation system 106 includes the font management system 104 and the glyph generation system 106 introduced above. As shown, the glyph generation system 106 in FIG. 13 includes a glyph image manager 1310, a glyph label manager 1312, an implicit differentiable font neural network manager 1314, a multi-curve differentiable model manager 1316, and a storage manager 1320. In addition, the storage manager 1320 includes an implicit differentiable font neural network 1322 having a font style embedded space 1324, a multi-curve representation model 1326, distance values 1328, and rendered glyphs 1330.

As shown, the glyph generation system 106 includes the glyph image manager 1310. In various implementations, the glyph image manager 1310 can identify, store, receive, detect, and/or access digital images having glyphs. For example, in one or more embodiments, the glyph image manager 1310 provides an input glyph to other components of the glyph generation system 106 to facilitate reconstruction, generation, or interpolation. In some implementations, the glyph image manager 1310 also facilitates the execution, display, and/or use of distance values 1328. For example, the glyph image manager 1310 causes rendered glyphs 1330 to be displayed on a computing device, or resized based on receiving an indication to resize the glyph to a larger scale (e.g., resizing the glyph according to the indication to the larger scale without degrading an appearance of the glyph).

As shown, the glyph generation system 106 includes the glyph label manager 1312. In one or more implementations, the glyph label manager 1312 manages, maintains, determines, generates, receives, detects, or identifies a glyph label for a glyph. For example, the glyph label manager 1312 analyzes a glyph image to determine a character depicted within the glyph image. In some cases, the glyph label manager 1312 generates a vector (e.g., a one-hot vector) representing the depicted character. For instance, the glyph label manager 1312 utilizes a text recognition model to determine a glyph label for a particular glyph image. In some implementations, the glyph label manager 1312 receives, detects, or identifies a glyph label from user input.

As illustrated in FIG. 13, the glyph generation system 106 also includes the implicit differentiable font neural network manager 1314. In one or more implementations, the implicit differentiable font neural network manager 1314 manages, maintains, generates, determines, identifies, extracts, trains, and/or utilizes an implicit differentiable font neural network 1322. For instance, as described herein, the implicit differentiable font neural network manager 1314 generates and utilizes the embedded space 1324 within the implicit differentiable font neural network 1322, as described above, to determine font style codes for an input glyph. Further, as described above, the implicit differentiable font neural network manager 1314 can utilize the implicit differentiable font neural network 1322 to generate distance values 1328 for an input font based on a glyph label and/or font style code.

Additionally, the glyph generation system 106 includes the multi-curve differentiable model manager 1316. In various implementations, the multi-curve differentiable model manager 1316 manages, determines, generates, or produces glyphs from distance values 1328. For instance, as described above, the multi-curve differentiable model manager 1316 rasterizes and/or renders multiple distance values 1328 for locations corresponding to an input glyph to generate multi-implicit neural glyph representations of the glyph corresponding to respective glyph labels utilizing a font style code. In some implementations, the multi-curve differentiable model manager 1316 manages or utilizes a multi-curve representation model 1326 and/or differentiable rasterization model, as described above. In connection with the implicit differentiable font neural network manager 1314, the multi-curve differentiable model manager 1316 generates scaled glyphs and glyph sets in accordance with this disclosure.

The glyph generation system 106 further includes a storage manager 1320. The storage manager 1320 includes, or operates in conjunction with, one or more memory devices that store various data. For example, the storage manager 1320 includes the implicit differentiable font neural network 1322 having the font style embedded space 1324, the multi-curve representation model 1326, the distance values 1328, and the rendered glyphs 1330.

In one or more implementations, each of the components of the glyph generation system 106 is in communication with one another using any suitable communication technologies. Additionally, the components of the glyph generation system 106 are in communication with one or more other devices including one or more client devices described above. It will be recognized that although the components of the glyph generation system 106 are shown to be separate in FIG. 13, any of the subcomponents may be combined into fewer components, such as into a single component, or divided into more components as may serve a particular implementation. Furthermore, although the components of FIG. 13 are described in connection with the glyph generation system 106, at least some of the components for performing operations in conjunction with the glyph generation system 106 described herein may be implemented on other devices within the environment.

The components of the glyph generation system 106 can include software, hardware, or both. For example, the components of the glyph generation system 106 can include one or more instructions stored on a computer-readable storage medium and executable by processors of one or more computing devices (e.g., the computing device 1300). When executed by one or more processors, the computer-executable instructions of the glyph generation system 106 can cause the computing device 1300 to perform the methods described herein. Alternatively, the components of the glyph generation system 106 can comprise hardware, such as a special purpose processing device to perform a certain function or group of functions. Additionally, or alternatively, the components of the glyph generation system 106 can include a combination of computer-executable instructions and hardware.

Furthermore, the components of the glyph generation system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the glyph generation system 106 may be implemented as part of a stand-alone application on a personal computing device or a mobile device. Alternatively, or additionally, the components of the glyph generation system 106 may be implemented in any application that allows creation and delivery of marketing content to users, including, but not limited to, applications in ADOBE® EXPERIENCE MANAGER and CREATIVE CLOUD®, such as ADOBE FONTS®, PHOTOSHOP®, LIGHTROOM®, and INDESIGN®. "ADOBE," "ADOBE EXPERIENCE MANAGER," "CREATIVE CLOUD," "ADOBE FONTS," "PHOTOSHOP," "LIGHTROOM," and "INDESIGN" are either registered trademarks or trademarks of Adobe Inc. in the United States and/or other countries.

FIGS. 1-13 the corresponding text, and the examples provide a number of different systems, methods, and non-transitory computer-readable media for a machine learning approach for generating scalable and semantically editable font representations. In addition to the foregoing, implementations can also be described in terms of flowcharts comprising acts for accomplishing a particular result. For example, FIG. 14 illustrates a flowchart of an example sequence or series of acts in accordance with one or more implementations.

Figure 14:
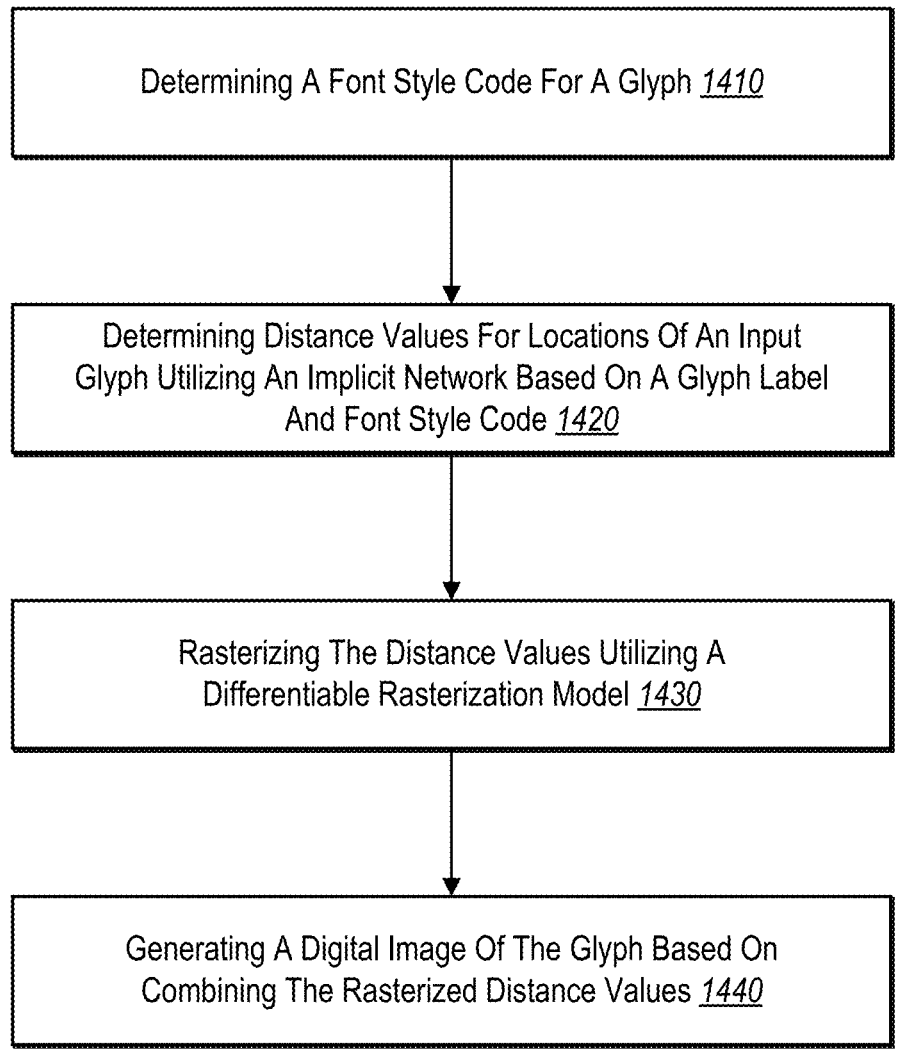
FIG. 14 illustrates a flowchart of a series of acts for generating a digital image of a rasterized glyph utilizing an implicit differentiable font neural network in accordance with one or more implementations.

While FIG. 14 illustrates acts according to particular implementations, alternative implementations may omit, add to, reorder, and/or modify any of the acts shown in FIG. 14. The acts of FIG. 14 can be performed as part of a method. Alternatively, a non-transitory computer-readable medium can comprise instructions, that when executed by one or more processors, cause a computing device to perform the acts of FIG. 14. In still further implementations, a system can perform the acts of FIG. 14. Additionally, the acts described herein may be repeated or performed in parallel with one another or in parallel with different instances of the same or other similar acts.

FIG. 14 illustrates an example series of acts 1400 for generating a digital image of a rasterized glyph utilizing an implicit differentiable font neural network in accordance with one or more implementations. To illustrate, the series of acts 1400 includes an act 1410 of determining a font style code for a glyph. For instance, the series of acts 1410 can involve determining a font style code for a glyph utilizing an implicit differentiable font neural network. In example implementations, the glyph is a rasterized image and/or is only a partial image of the glyph (e.g., not the full glyph). In some implementations, the act 1410 includes determining the font style code for the glyph by interpolating between two or more known font style codes.

In addition, as shown, the series of acts 1400 includes an act 1420 of determining distance values for locations of an input glyph utilizing an implicit network based on a glyph label and font style code. For instance, the series of acts 1420 can involve determining, utilizing the implicit differentiable font neural network, three or more signed distance values per location of the glyph to be rendered based on a glyph label and the font style code for the glyph. In one or more implementations, the act 1420 includes determining, utilizing the implicit differentiable font neural network, a plurality of signed distance values for the glyph based on a glyph label and a font style code for the glyph. In some implementations, a set of multiple signed distance field pixel values for a pixel includes distances from the pixel to the closest boundary of the glyph and an indication of whether the pixel is located inside of the glyph.

As also shown, the series of acts 1400 includes an act 1430 of rasterizing the distance values utilizing a differentiable rasterization model. For instance, the series of acts 1430 can involve rasterizing the three or more signed distance values utilizing a differentiable rasterization model. In one or more implementations, the act 1430 includes rasterizing the plurality of signed distance values into a plurality of curves utilizing a differentiable rasterization model.

Further, as shown, the series of acts 1400 includes an act 1440 of generating a digital image of the glyph based on combining the rasterized distance values. For instance, the series of acts 1440 can involve generating a digital image of the glyph based on combining the rasterized three or more signed distance values. In one or more implementations, the act 1440 includes generating a digital image of the glyph based on combining the plurality of curves.

In some implementations, the act 1440 includes generating, utilizing the implicit differentiable font neural network, a glyph set that corresponds to the font style code where the glyph set includes the glyph and different glyphs. In certain implementations, the act 1440 includes generating, utilizing the implicit differentiable font neural network, the digital image of the glyph to include a reconstruction of the glyph. In various implementations, the act 1440 includes generating, utilizing the implicit differentiable font neural network, a new glyph set based on the interpolated style code that does not correspond to a known glyph set.

In several implementations, the act 1440 includes generating the digital image of the glyph based on combining the rasterized three or more signed distance values utilizing a median function. In example implementations, the median function determines an opacity for a location of the glyph based on multiple signed distance values corresponding to the location.

The series of acts 1400 can include additional acts in various implementations. For instance, in one or more implementations, the series of acts 1400 includes an act of generating the implicit differentiable font neural network to determine the plurality of signed distance values for pixel locations of glyphs based on comparing rasterized images of glyphs input into the implicit differentiable font neural network to corresponding predicted rasterized images of glyphs generated from the plurality of signed distance values outputted from the implicit differentiable font neural network. In some implementations, the series of acts 1400 includes an act of generating the implicit differentiable font neural network based on a corner template function that models sharp corners of a shape.

In various implementations, the series of acts 1400 includes an act of generating a corner template for a corner of the glyph by generating three or more curves intersecting at the corner that indicate binary quadrants on one or more binary maps surrounding the corner. In some implementations, the series of acts 1400 includes an act of generating the three or more curves (and sometimes two curves) for the corner based on the plurality of signed distance values generated for a location of the glyph corresponding to the corner. In certain implementations, the series of acts 1400 includes an act of rendering a convex or concave corner for the corner based on values of two or more of the binary quadrants surrounding the corner.

In some implementations, the series of acts 1400 includes an act of utilizing a corner template function to generate the implicit differentiable font neural network by maximizing and minimizing three curves from the plurality of curves that corresponds to a corner location of the glyph. In one or more implementations, the series of acts 1400 includes an act of generating the implicit differentiable font neural network to determine the plurality of signed distance values for pixel locations of glyphs based on minimizing corner template loss, global shape loss, and/or gradient loss.

In one or more implementations, the series of acts 1400 includes acts of receiving an indication to resize the glyph to a larger scale and resizing the glyph according to the indication to the larger scale without degrading the appearance of the glyph.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry desired program code means in the form of computer-executable instructions or data structures and which can be accessed by a general-purpose or special-purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some implementations, computer-executable instructions are executed on a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
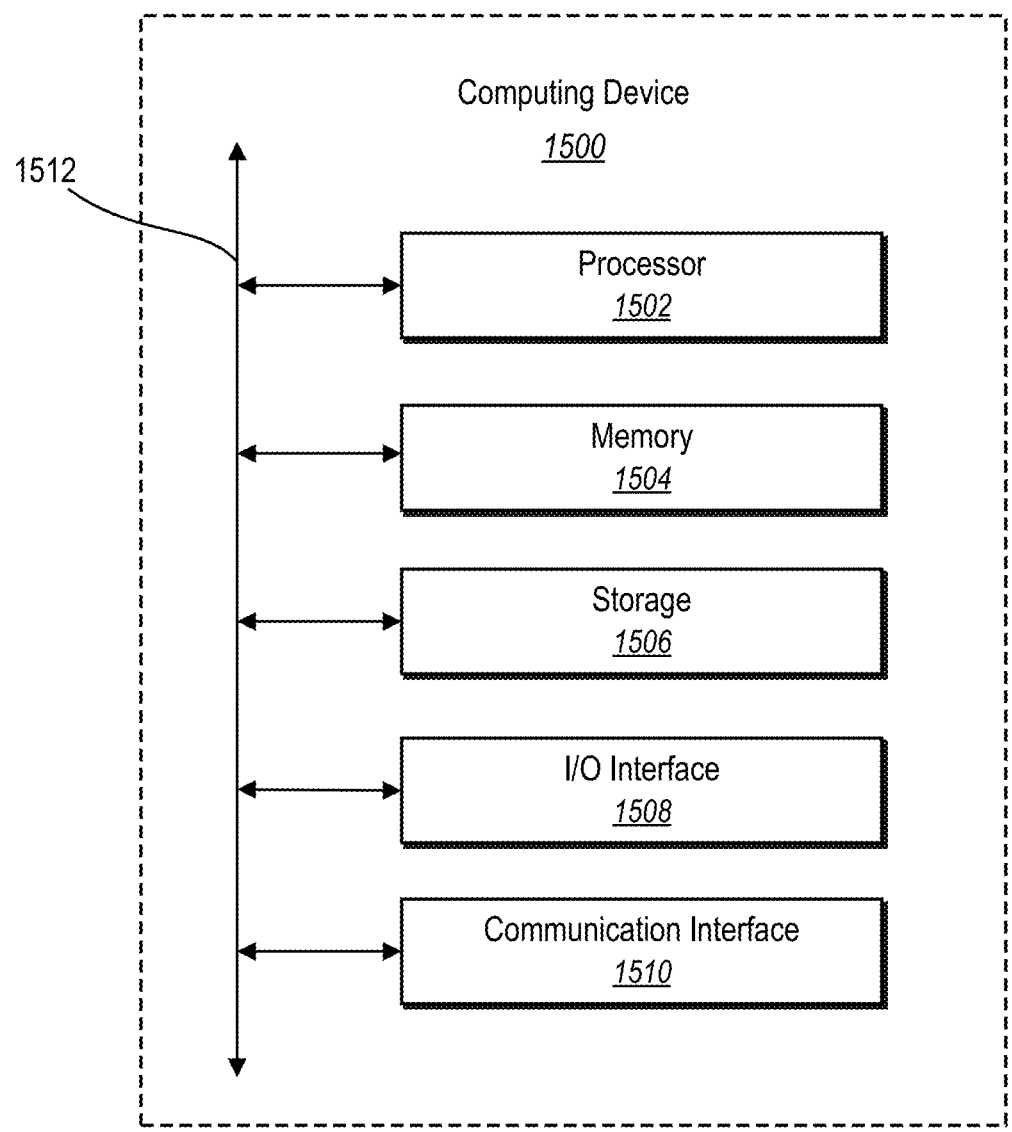
FIG. 15 illustrates a block diagram of an example computing device in accordance with one or more implementations.

FIG. 15 illustrates, in block diagram form, an example computing device 1500 (e.g., the computing device 1300, the server(s) 102 and/or the client device 108) that may be configured to perform one or more of the processes described above. One will appreciate that the glyph generation system 106 can comprise implementations of the computing device 1500. As shown by FIG. 15, the computing device can comprise a processor 1502, memory 1504, a storage device 1506, an I/O interface 1508, and a communication interface 1510. Furthermore, the computing device 1500 can include an input device such as a touchscreen, mouse, keyboard, etc. In certain implementations, the computing device 1500 can include fewer or more components than those shown in FIG. 15. Components of computing device 1500 shown in FIG. 15 will now be described in additional detail.

In particular implementations, the processor 1502 includes hardware for executing instructions, such as those making up a computer program. As an example, and not by way of limitation, to execute instructions, the processor 1502 may retrieve (or fetch) the instructions from an internal register, an internal cache, memory 1504, or a storage device 1506 and decode and execute them.

The computing device 1500 includes memory 1504, which is coupled to the processor 1502. The memory 1504 may be used for storing data, metadata, and programs for execution by the processor(s). The memory 1504 may include one or more volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example, and not by way of limitation, storage device 1506 can comprise a non-transitory storage medium described above. The storage device 1506 may include a hard disk drive (HDD), flash memory, a Universal Serial Bus (USB) drive, or a combination of these or other storage devices.

The computing device 1500 also includes one or more input or output ("I/O") interfaces (or devices), shown as I/O interface 1508, which are provided to allow a user to provide input to (such as user strokes), receive output from, and otherwise transfer data to and from the computing device 1500. These I/O interface 1508 may include a mouse, keypad or a keyboard, a touch screen, camera, optical scanner, network interface, modem, other known I/O devices, or a combination of such I/O interface 1508. The touch screen may be activated with a writing device or a finger.

The I/O interface 1508 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1508 is configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 can provide one or more interfaces for communication (e.g., packet-based communication) between the computing device 1500 and one or more other computing devices or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can comprise hardware, software, or both that couples components of computing device 1500 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with fewer or more acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
a memory component; and
a processing device coupled to the memory component, the processing device to perform operations comprising:
determining a font style code for a glyph from a plurality of font style codes utilizing an implicit differentiable font neural network wherein the font style code is mapped to a location within a font style embedding space;
generating a concatenation of a glyph label and the font style code;

determining, for each location of a plurality of locations of the glyph, utilizing the implicit differentiable font neural network, a plurality of signed distance values for the glyph based on the concatenation of the glyph label and the font style code for the glyph;

rasterizing the plurality of signed distance values for each location of a plurality of locations of the glyph into a plurality of curves utilizing a differentiable rasterization model; and generating a digital image of the glyph based on combining the plurality of curves.

2. The system of claim 1, further comprising determining the font style code for the glyph utilizing the implicit differentiable font neural network.

3. The system of claim 1, further comprising generating, utilizing the implicit differentiable font neural network, a glyph set that corresponds to the glyph and the font style code, the glyph set comprising a plurality of different glyphs.

4. The system of claim 1, further comprising generating the implicit differentiable font neural network to determine the plurality of signed distance values for pixel locations of glyphs based on comparing rasterized images of glyphs input into the implicit differentiable font neural network to corresponding predicted rasterized images of glyphs generated from the plurality of signed distance values outputted from the implicit differentiable font neural network.

5. The system of claim 1, further comprising generating a corner template for a corner of the glyph by generating three or more curves intersecting at the corner that indicate binary quadrants on one or more binary maps surrounding the corner.

6. The system of claim 5, further comprising generating the three or more curves for the corner based on the plurality of signed distance values generated for a location of the glyph corresponding to the corner.

7. The system of claim 5, further comprising rendering a convex or concave corner for the corner based on values of two or more of the binary quadrants surrounding the corner.

8. The system of claim 1, further comprising utilizing a corner template function to generate the implicit differentiable font neural network by maximizing and minimizing three curves from the plurality of curves that corresponds to a corner location of the glyph.

9. The system of claim 1, further comprising generating the implicit differentiable font neural network to determine the plurality of signed distance values for pixel locations of glyphs based on minimizing corner template loss.

10. The system of claim 1, further comprising generating the implicit differentiable font neural network to determine the plurality of signed distance values for pixel locations of glyphs based on global shape loss and gradient loss.

11. A non-transitory computer-readable medium storing executable instructions that, which when executed by a processing device, cause a processing device to perform operations comprising:

determining a font style code for a glyph from a plurality of font style codes utilizing an implicit differentiable font neural network wherein the font style code is mapped to a location within a font style embedding space;

generating a concatenation of a glyph label and the font style code;

determining, utilizing the implicit differentiable font neural network, three or more signed distance values for each location of a plurality of locations of the glyph to be rendered based on the concatenation of the glyph label and the font style code for the glyph;

rasterizing the three or more signed distance values for each location of a plurality of locations of the glyph utilizing a differentiable rasterization model; and generating a digital image of the glyph based on combining the rasterized three or more signed distance values.

12. The non-transitory computer-readable medium of claim 11, further comprising generating, utilizing the implicit differentiable font neural network, a glyph set that corresponds to the font style code comprising the glyph and different glyphs.

13. The non-transitory computer-readable medium of claim 11, wherein the glyph comprises a partial image of the glyph; and further comprising generating, utilizing the implicit differentiable font neural network, the digital image of the glyph comprising a reconstruction of the glyph.

14. The non-transitory computer-readable medium of claim 11, further comprising determining the font style code for the glyph by interpolating between two or more known font style codes.

15. The non-transitory computer-readable medium of claim 14, further comprising generating, utilizing the implicit differentiable font neural network, a new glyph set based on the interpolated style code that does not correspond to a known glyph set.

16. The non-transitory computer-readable medium of claim 11, further comprising generating the digital image of the glyph based on combining the rasterized three or more signed distance values utilizing a median function, wherein the median function determines an opacity for a location of the glyph based on multiple signed distance values corresponding to the location.

17. A method comprising:

determining a font style code for a glyph from a plurality of font style codes identified from a first digital image wherein the font style code is mapped to a location within a font style embedding space;

generating a concatenation of a glyph label and the font style code;

determining, for each location of a plurality of locations of the glyph, a plurality of signed distance field values for the glyph based on the concatenation of the glyph label and the font style code for the glyph;

rasterizing the plurality of signed distance values for each location of a plurality of locations of the glyph into a plurality of curves utilizing a differentiable rasterization model; and generate a second digital image of the glyph utilizing the plurality of curves.

18. The method of claim 17, further comprising determining that the first digital image of the glyph comprises an incomplete image of the glyph.

19. The method of claim 17, further comprising:

receiving an indication to resize the glyph to a larger scale; and resizing the glyph according to the indication to the larger scale without degrading an appearance of the glyph.

20. The method of claim 17, wherein the plurality of signed distance field values for a pixel comprises:

distances from the pixel to a closest boundary of the glyph; and whether the pixel is located inside of the glyph.

* * * * *